(12) United States Patent
Kobori

(10) Patent No.: US 10,310,154 B2
(45) Date of Patent: Jun. 4, 2019

(54) OPTICAL MEMBER, POLARIZATION MEMBER, AND DISPLAY DEVICE EMPLOYING POLYMER FILM

(71) Applicant: SAMSUNG ELECTRONICS CO., LTD., Suwon-si (KR)

(72) Inventor: Shigeto Kobori, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 15/711,547

(22) Filed: Sep. 21, 2017

(65) Prior Publication Data

US 2018/0081101 A1 Mar. 22, 2018

(30) Foreign Application Priority Data

Sep. 21, 2016 (JP) .................................. 2016-184864
Aug. 28, 2017 (KR) ......................... 10-2017-0108851

(51) Int. Cl.
*C08J 7/04* (2006.01)
*G02B 1/14* (2015.01)
*G02B 5/30* (2006.01)

(52) U.S. Cl.
CPC .............. *G02B 5/305* (2013.01); *C08J 7/047* (2013.01); *G02B 1/14* (2015.01); *C08J 2301/12* (2013.01);
(Continued)

(58) Field of Classification Search
CPC ...... G02B 5/30; G02B 5/3025; G02B 5/3033; G02B 5/3041; G02B 5/305; G02B 5/02;
(Continued)

(56) References Cited

U.S. PATENT DOCUMENTS

2014/0227482 A1* 8/2014 Shibata .................... G02B 1/04
428/141
2017/0131439 A1 5/2017 Kobori et al.

FOREIGN PATENT DOCUMENTS

JP 2005298716 A 10/2005
JP 200723107 A 2/2007
(Continued)

OTHER PUBLICATIONS

Search Report dated Jan. 15, 2018, issued by the International Searching Authority in counterpart International Patent Application No. PCT/KR2017/010297 (PCT/ISA/210).
(Continued)

*Primary Examiner* — Derek S. Chapel
*Assistant Examiner* — Adam W Booher
(74) *Attorney, Agent, or Firm* — Sughrue Mion, PLLC

(57) ABSTRACT

Provided is a polymer film in which metal oxide particles are localized to a great degree, wherein the polymer film is a hard coat layer that includes a binder including a first polymer component and a second polymer component that are miscible with each other and metal oxide particles that are unevenly distributed with a greater concentration toward at least one of a surface portion and the other surface portion opposite the surface portion, wherein the first polymer component may be hydrophilic, the second polymer component may be hydrophobic relative to the first polymer component, a proportion of the first polymer component may gradually decrease from the surface portion to the other surface portion, and the surface portion may be toward a substrate for forming the polymer film. An optical member, such as a polarization member, and a display device employing the polymer film are also provided.

20 Claims, 12 Drawing Sheets

(52) U.S. Cl.
CPC ........ *C08J 2333/08* (2013.01); *C08J 2333/24* (2013.01); *C08J 2433/08* (2013.01); *C08J 2433/24* (2013.01)

(58) Field of Classification Search
CPC .. G02B 5/0205; G02B 5/0236; G02B 5/0242; G02B 1/10; G02B 1/105; G02B 1/11; G02B 1/14; G02B 1/16; G02B 1/18; C08J 7/042; C08J 7/047; C08J 2301/12; C08J 2333/08; C08J 2333/24; C08J 2433/08; C08J 2433/24
See application file for complete search history.

(56) References Cited

FOREIGN PATENT DOCUMENTS

| | | |
|---|---|---|
| JP | 200738199 A | 2/2007 |
| JP | 2007293313 A | 11/2007 |
| JP | 2009-35595 A | 2/2009 |
| JP | 201337057 A | 2/2013 |
| JP | 2013-136222 A | 7/2013 |
| JP | 2016-155992 A | 9/2016 |
| KR | 10-1416610 B1 | 7/2014 |
| KR | 10-1626618 B1 | 6/2016 |

OTHER PUBLICATIONS

Written Opinion dated Jan. 15, 2018, issued by the International Searching Authority in counterpart International Patent Application No. PCT/KR2017/010297 (PCT/ISA/237).

* cited by examiner

FIG. 8

| | COMPONENT | | | | | EVALUATION RESULTS | | | |
|---|---|---|---|---|---|---|---|---|---|
| | METAL OXIDE PARTICLES (TYPE, ADDED AMOUNT (wt%)) | BINDER | | ANTISTATIC AGENT (PEDOT) (wt%) | PHOTOPOLY-MERIZATION INITIATOR (IRGACURE127) (wt%) | PHASE SEPARATION | REFRACTIVE INDEX ON SURFACE LAYER | SURFACE RESISTANCE VALUE (Ω/□) | FILM THICKNESS (μm) |
| | | FIRST COMPONEN (TYPE, ADDED AMOUNT (wt%)) | SECOND COMPONENT (TYPE, ADDED AMOUNT (wt%)) | | | | | | |
| EXAMPLE 1 | $Sb_2O_5$ 2.2 | DMAA 30 | TMMT 64.5 | 1.3 | 2.0 | ○ | 1.64 | 8.00E+09 | 5.5 |
| EXAMPLE 2 | $Sb_2O_5$ 2.2 | DEAA 30 | TMMT 64.5 | 1.3 | 2.0 | ○ | 1.64 | 7.50E+09 | 5.5 |
| EXAMPLE 3 | $Sb_2O_5$ 2.2 | NMMA 30 | TMMT 64.5 | 1.3 | 2.0 | ○ | 1.64 | 7.80E+09 | 5.5 |
| EXAMPLE 4 | $Sb_2O_5$ 2.2 | NBMA 30 | TMMT 64.5 | 1.3 | 2.0 | ○ | 1.64 | 7.10E+09 | 5.5 |
| EXAMPLE 5 | $Sb_2O_5$ 2.2 | IBMA 30 | TMMT 64.5 | 1.3 | 2.0 | ○ | 1.64 | 4.50E+09 | 5.5 |
| EXAMPLE 6 | $Sb_2O_5$ 2.2 | HEAA 30 | TMMT 64.5 | 1.3 | 2.0 | ○ | 1.64 | 3.10E+09 | 5.5 |
| EXAMPLE 7 | $Sb_2O_5$ 2.2 | ACMO 30 | TMMT 64.5 | 1.3 | 2.0 | ○ | 1.64 | 8.90E+09 | 5.5 |
| EXAMPLE 8 | $Sb_2O_5$ 2.2 | DAAM 30 | TMMT 64.5 | 1.3 | 2.0 | ○ | 1.64 | 4.40E+09 | 5.5 |
| EXAMPLE 9 | $Sb_2O_5$ 2.2 | TBAA 30 | TMMT 64.5 | 1.3 | 2.0 | ○ | 1.64 | 6.90E+09 | 5.5 |
| EXAMPLE 10 | $Sb_2O_5$ 2.2 | MBAA 30 | TMMT 64.5 | 1.3 | 2.0 | ○ | 1.64 | 8.30E+09 | 5.5 |
| COMPARATIVE EXAMPLE 1 | $Sb_2O_5$ 2.2 | DMAEA 30 | TMMT 64.5 | 1.3 | 2.0 | × | 1.54 | 8.00E+09 | 5.5 |

FIG. 9

| | COMPONENT | | | | | | EVALUATION RESULTS | | | |
|---|---|---|---|---|---|---|---|---|---|---|
| | METAL OXIDE PARTICLES (TYPE, ADDED AMOUNT (wt%)) | BINDER | | ANTISTATIC AGENT (PEDOT) (wt%) | PHOTOPOLY-MERIZATION INITIATOR (IRGACURE127) (wt%) | PHASE SEPARATION | REFRACTIVE INDEX ON SURFACE LAYER | SURFACE RESISTANCE VALUE (Ω/□) | FILM THICKNESS (μm) |
| | | FIRST COMPONENT (TYPE, ADDED AMOUNT (wt%)) | SECOND COMPONENT (TYPE, ADDED AMOUNT (wt%)) | | | | | | | |
| COMPARATIVE EXAMPLE 2 | $Sb_2O_5$ 2.2 | – | TMMT 94.5 | 1.3 | 2.0 | × | 1.54 | 6.80E+09 | 5.5 |
| COMPARATIVE EXAMPLE 3 | $Sb_2O_5$ 2.2 | NMMA 10 | TMMT 84.5 | 1.3 | 2.0 | × | 1.54 | 5.50E+09 | 5.5 |
| COMPARATIVE EXAMPLE 4 | $Sb_2O_5$ 2.2 | NMMA 15 | TMMT 79.5 | 1.3 | 2.0 | × | 1.54 | 4.90E+09 | 5.5 |
| EXAMPLE 11 | $Sb_2O_5$ 2.2 | NMMA 20 | TMMT 74.5 | 1.3 | 2.0 | ○ | 1.60 | 7.80E+09 | 5.5 |
| EXAMPLE 12 | $Sb_2O_5$ 2.2 | NMMA 40 | TMMT 54.5 | 1.3 | 2.0 | ○ | 1.64 | 7.80E+09 | 5.5 |
| EXAMPLE 13 | $Sb_2O_5$ 2.2 | NMMA 50 | TMMT 44.5 | 1.3 | 2.0 | ○ | 1.64 | 7.80E+09 | 5.5 |
| EXAMPLE 14 | $Sb_2O_5$ 2.2 | NMMA 80 | TMMT 14.5 | 1.3 | 2.0 | ○ | 1.64 | 7.80E+09 | 5.5 |
| EXAMPLE 15 | $Sb_2O_5$ 2.2 | NMMA 90 | TMMT 4.5 | 1.3 | 2.0 | ○ | 1.64 | 7.80E+09 | 5.5 |
| COMPARATIVE EXAMPLE 5 | $Sb_2O_5$ 2.2 | NMMA 94.5 | – | 1.3 | 2.0 | × | 1.52 | 1.70E+09 | 5.5 |

FIG. 10

| | COMPONENT | | | | | EVALUATION RESULTS | | | |
|---|---|---|---|---|---|---|---|---|---|
| | METAL OXIDE PARTICLES (TYPE, ADDED AMOUNT (wt%)) | BINDER | | ANTISTATIC AGENT (PEDOT) (wt%) | PHOTOPOLY-MERIZATION INITIATOR (IRGACURE127) (wt%) | PHASE SEPARATION | REFRACTIVE INDEX ON SURFACE LAYER | SURFACE RESISTANCE VALUE (Ω/□) | FILM THICKNESS (μm) |
| | | FIRST COMPONENT (TYPE, ADDED AMOUNT (wt%)) | SECOND COMPONENT (TYPE, ADDED AMOUNT (wt%)) | | | | | | |
| EXAMPLE 16 | $Sb_2O_5$ 2.2 | — | DCPA 64.5 | 1.3 | 2.0 | ○ | 1.64 | 9.80E+09 | 5.5 |
| EXAMPLE 17 | $Sb_2O_5$ 2.2 | NMMA 30 | TMPTA 64.5 | 1.3 | 2.0 | ○ | 1.64 | 5.60E+09 | 5.5 |
| EXAMPLE 18 | $Sb_2O_5$ 2.2 | NMMA 30 | ETHOXYLATED ISOCYANURIC ACID TRIACRYLATE 64.5 | 1.3 | 2.0 | ∨ | 1.64 | 4.90E+09 | 5.5 |
| EXAMPLE 19 | $Sb_2O_5$ 2.2 | NMMA 30 | PENTAERYTHRITOL TRIACRYLATE 64.5 | 1.3 | 2.0 | ○ | 1.59 | 8.10E+09 | 5.5 |
| COMPARATIVE EXAMPLE 6 | $Sb_2O_5$ 2.2 | NMMA 30 | 35mol ETHOXYLATED PENTAERYTHRITOL TETRAACRYLATE 64.5 | 1.3 | 2.0 | × | 1.52 | 7.80E+09 | 5.5 |
| COMPARATIVE EXAMPLE 7 | $Sb_2O_5$ 2.2 | NMMA 30 | 20mol ETHOXYLATED GLYCERIN TRIACRYLATE 64.5 | 1.3 | 2.0 | × | 1.53 | 7.80E+09 | 5.5 |

FIG. 11

| | COMPONENT | | | | | | EVALUATION RESULTS | | | |
|---|---|---|---|---|---|---|---|---|---|---|
| | METAL OXIDE PARTICLES (TYPE, ADDED AMOUNT (wt%)) | BINDER | | ANTISTATIC AGENT (PEDOT) (wt%) | PHOTOPOLY- MERIZATION INITIATOR (IRGACURE127) (wt%) | | PHASE SEPARATION | REFRACTIVE INDEX ON SURFACE LAYER | SURFACE RESISTANCE VALUE (Ω/□) | FILM THICKNESS (μm) |
| | | FIRST COMPONEN (TYPE, ADDED AMOUNT (wt%)) | SECOND COMPONENT (TYPE, ADDED AMOUNT (wt%)) | | | | | | | |
| EXAMPLE 20 | ATO 2.2 | NMMA 30 | TMMT 64.5 | 1.3 | 2.0 | | ○ | 1.66 | 8.80E+09 | 5.5 |
| EXAMPLE 21 | PTO 2.2 | NMMA 30 | TMMT 64.5 | 1.3 | 2.0 | | ○ | 1.66 | 9.10E+09 | 5.5 |
| EXAMPLE 22 | $ZrO_2$ 2.2 | NMMA 30 | TMMT 64.5 | 1.3 | 2.0 | | ○ | 1.68 | 6.80E+09 | 5.5 |
| EXAMPLE 23 | $TiO_2$ 2.2 | NMMA 30 | TMMT 64.5 | 1.3 | 2.0 | | ○ | 1.70 | 5.90E+09 | 5.5 |

OPTICAL MEMBER, POLARIZATION MEMBER, AND DISPLAY DEVICE EMPLOYING POLYMER FILM

CROSS-REFERENCE TO RELATED APPLICATIONS

This application claims foreign priority under 35 U.S.C. § 119 from Japanese Patent Application No. 2016-184864, filed on Sep. 21, 2016, in the Japanese Patent Office and from Korean Patent Application No. 10-2017-0108851, filed on Aug. 28, 2017, in the Korean Intellectual Property Office, the disclosures of which are incorporated herein in their entireties by reference.

BACKGROUND

1. Field

Exemplary embodiments consistent with the present disclosure relates to an optical member, such as a polarization member, and a display device employing a polymer film, and more particularly, to an optical member, such as a polarization member, and a display device employing a polymer film in which metal oxide particles are localized to a great degree.

2. Description of Related Art

In a display device, an optical member, such as a polarization member, may be provided on a surface of a display unit. For example, a display device including a liquid crystal panel may have a polarization film at an outermost surface thereof. A surface of the polarization film may be, for example, formed of a triacetyl cellulose (TAC) film. However, since the TAC film is susceptible to being scratched, a hard coat layer may be disposed on the TAC film so as to prevent the TAC film from being scratched. Here, to prevent scratches, metal oxide particles are generally included in the hard coat layer.

Also, the polarization film may have an anti-reflection function to suppress reflection of an image of objects inside and outside a room on a screen of the display device. In this regard, a low refractive layer for suppressing reflection of light incident from the outside may be disposed on the hard coat layer. In this case, in order to suppress the reflection of an image of objects inside and outside a room on a screen of the display device, it is desirable that the hard coat layer has a relatively high refractive index. To this end, attempts have been made to localize metal oxide particles in the hard coat layer. Attempts have also been made to form a multi-layered hard coat layer.

JP 2007-023107 discloses an antistatic hard coat layer formed of a composition including conductive fine particles and a binder. The binder includes a sufficient amount of hydroxyl groups for the conductive fine particles to localize in the antistatic hard coat layer.

However, by using conventional methods, it is hard to localize the metal oxide particles in the hard coat layer to a sufficient degree. Further, in order to form a multi-layered hard coat layer, separate processes of coating each layer are necessary. Therefore, when a multi-layered hard coat layer is produced, the productivity is poor, and the manufacturing cost is likely to be relatively high.

SUMMARY

Provided is a polymer film in which metal oxide particles are localized to a great degree.

Provided are an optical member, a polarization member, and a display device employing the polymer film.

Additional aspects will be set forth in part in the description which follows and, in part, will be apparent from the description, or may be learned by practice of the presented exemplary embodiments.

According to an aspect of an exemplary embodiment, a polymer film includes a binder including a first polymer component and a second polymer component that are miscible with each other, and metal oxide particles that are unevenly distributed with a greater concentration toward at least one of a surface portion of the polymer film and the other surface portion opposite the surface portion, wherein the first polymer component may be hydrophilic, the second polymer component may be hydrophobic relative to the first polymer component, and a proportion of the first polymer component may gradually decrease from the surface portion to the other surface portion.

According to an aspect of another exemplary embodiment, a display device includes a display means that displays an image; and a polymer film on the display means, wherein the polymer film includes a binder including a first polymer component and a second polymer component that are miscible with each other and metal oxide particles that are unevenly distributed with a greater concentration toward at least one of a surface portion and the other surface portion opposite the surface portion, wherein the first polymer component may be hydrophilic, the second polymer component may be hydrophobic relative to the first polymer component, a proportion of the first polymer component may gradually decrease from the surface portion to the other surface portion, and the surface portion may be a portion located toward the display means.

In the display device according to an aspect of another exemplary embodiment, the display means may be a liquid crystal panel, an organic light-emitting diode (OLED) device, or a Braun tube display.

In the polymer film according to an aspect of an exemplary embodiment and in the display device according to an aspect of another exemplary embodiment, the polymer film includes a binder and metal oxide particles. The binder includes a first polymer component, which is hydrophilic; and a second polymer component, which is miscible with the first polymer component and is hydrophobic relative to the first polymer component. A proportion of the first polymer component may gradually decrease from a surface portion to the other surface portion, wherein the surface portion may be a portion located toward the substrate for forming the polymer film or toward the display means. The metal oxide particles are unevenly distributed with a greater concentration toward at least one of the surface portion and the other surface portion opposite the surface portion.

In the polymer film according to an aspect of an exemplary embodiment and in the display device according to an aspect of another exemplary embodiment, the binder may further include a mixed layer between the surface portion and the other surface portion, in which the first polymer component and the second polymer component are miscible with each other. That is, in the mixed layer between the surface portion and the other surface portion, the first polymer component and the second polymer component are miscible with each other.

In the polymer film according to an aspect of an exemplary embodiment and in the display device according to an aspect of another exemplary embodiment, a thickness of the polymer film is in a range of about 1 micrometer (µm) to about 15 µm and any thickness range therebetween, for example, about 1 µm to about 11 µm, or for example, about 3 µm to about 11 µm.

In the polymer film according to an aspect of an exemplary embodiment and in the display device according to an aspect of another exemplary embodiment, it may be desirable that the metal oxide particles are unevenly distributed with a greater concentration toward the other surface portion.

In the polymer film according to an aspect of an exemplary embodiment and in the display device according to an aspect of another exemplary embodiment, the binder is a product of photopolymerization of a first component that constitutes the first polymer component and a second component that constitutes the second polymer component. The first component is at least one of a monomer and an oligomer, wherein the monomer and the oligomer each include an acrylamide skeleton and at least one photopolymerizable functional group in one molecule. The second component is a monomer which includes at least two photopolymerizable functional groups in one molecule.

In the polymer film according to an aspect of an exemplary embodiment and in the display device according to an aspect of another exemplary embodiment, the polymer film may further include an antistatic agent and a polymerization initiator, which are mainly distributed toward the other surface portion.

In the display device according to an aspect of another exemplary embodiment, a hydrophilicity of the first component is greater than that of the display means, a hydrophilicity of the display means is greater than that of the second component, and a hydrophilicity of the second component is greater than that of the metal oxide particles.

In the polymer film according to an aspect of an exemplary embodiment and in the display device according to an aspect of another exemplary embodiment, an amount of the first component is in a range of about 20 parts by weight or greater and about 90 parts by weight or less, based on 100 parts by weight of a total weight of the polymer film. An amount of the second component is in a range of about 5 parts to about 90 parts by weight, based on 100 parts by weight of the total weight of the polymer film. An amount of the metal oxide particles is in a range of about 0.1 parts to about 10 parts by weight, based on 100 parts by weight of the total weight of the polymer film. An amount of the antistatic agent is in a range of about 0.1 parts to about 10 parts by weight, based on 100 parts by weight of the total weight of the polymer film. An amount of the polymerization initiator is in a range of about 0.5 parts to about 10 parts by weight, based on 100 parts by weight of the total weight of the polymer film.

The display device according to an aspect of another exemplary embodiment further includes a low refractive index layer having a refractive index smaller than that of the polymer film, wherein the low refractive index layer is on the other surface portion of the polymer film.

In the display device according to an aspect of another exemplary embodiment, the low refractive index layer is hydrophobic relative to the binder and the metal oxide particles.

In the display device according to an aspect of another exemplary embodiment, a protective or protection film may be affixed to the top of the polymer film to protect the display means.

In one exemplary embodiment, the display device includes a display for displaying an image, and a polymer film disposed on the display. The polymer film includes a binder and metal oxide particles. The binder includes a first polymer component and a second polymer component, where the first polymer component and the second polymer component are miscible with each other. The metal oxide particles are unevenly distributed in a thickness direction of the polymer film with a relatively greater concentration of the metal oxide particles being located toward at least one of a surface portion of the polymer film and an other surface portion of the polymer film that is opposite the surface portion in the thickness direction. The first polymer component is hydrophilic, and the second polymer component is hydrophobic relative to the first polymer component. A proportion of the first polymer component gradually decreases from the surface portion to the other surface portion. The surface portion is a portion of the polymer film located closest to the display means.

According to an aspect of still another exemplary embodiment, an optical member includes a substrate; and a polymer film on the substrate, wherein the polymer film includes a binder including a first polymer component and a second polymer component that are miscible with each other and metal oxide particles that are unevenly distributed with a greater concentration toward at least one of a surface portion and the other surface portion opposite the surface portion, wherein the first polymer component may be hydrophilic, the second polymer component may be hydrophobic relative to the first polymer component, a proportion of the first polymer component may gradually decrease from the surface portion to the other surface portion, and the surface portion may be a portion located toward the substrate.

The optical member includes a substrate and a polymer film (which may also be referred to herein as a 'polymer layer'). The substrate is for forming the polymer film. The polymer film includes a binder and metal oxide particles. The binder includes the first polymer component and the second polymer component that are miscible with each other, wherein the first polymer component is hydrophilic, and the second polymer component is hydrophobic relative to the first polymer component. A proportion of the first polymer component may gradually decrease from the surface portion to the other surface portion opposite the surface portion, and the surface portion may be a portion located toward the substrate. The metal oxide particles are unevenly distributed with a greater concentration toward at least one of the surface portion and the other surface portion.

The optical member may further include a low refractive index layer having a refractive index smaller than that of the polymer film, wherein the low refractive index layer is on the other surface portion of the polymer film. The low refractive index layer is hydrophobic relative to the binder and the metal oxide particles. The metal oxide particles may be unevenly distributed with a greater concentration toward the other surface portion.

In one exemplary embodiment, the optical member includes a substrate, and a polymer film disposed on the substrate. The polymer film includes a binder and metal oxide particles. The binder includes a first polymer component and a second polymer component. The first polymer component and the second polymer component are miscible with each other. The metal oxide particles are unevenly distributed in a thickness direction of the polymer film with a relatively greater concentration of the metal oxide particles being located toward at least one of a surface portion and an other surface portion of the polymer film that is opposite the surface portion in the thickness direction. The first polymer component is hydrophilic, and the second polymer component is hydrophobic relative to the first polymer component.

A proportion of the first polymer component gradually decreases from the surface portion to the other surface portion. The surface portion is a portion of the polymer film located closest to the substrate.

According to an aspect of still another exemplary embodiment, a polarization member includes a polarization means that polarizes light; and a polymer film on the polarization means, wherein the polymer film includes a binder including a first polymer component and a second polymer component that are miscible with each other and metal oxide particles that are unevenly distributed with a greater concentration toward at least one of a surface portion and the other surface portion opposite the surface portion, wherein the first polymer component may be hydrophilic, the second polymer component may be hydrophobic relative to the first polymer component, a proportion of the first polymer component may gradually decrease from the surface portion to the other surface portion, and the surface portion may be a portion located toward the polarization means.

That is, the polarization member includes a polarization means that polarizes light; and a polymer film. The polymer film includes a binder and metal oxide particles. The binder includes the first polymer component and the second polymer component that are miscible with each other, wherein the first polymer component is hydrophilic, and the second polymer component is hydrophobic relative to the first polymer component. A proportion of the first polymer component may gradually decrease from the surface portion to the other surface portion opposite the surface portion, and the surface portion may be a portion located toward the substrate for forming the polymer film or toward the polarization means. The metal oxide particles are unevenly distributed with a greater concentration toward at least one of the surface portion and the other surface portion.

In one exemplary embodiment, the polarization member includes a polarizer for polarizing light, and a polymer film disposed on the polarization means. The polymer film includes a binder and metal oxide particles. The binder includes a first polymer component and a second polymer component. The first polymer component and the second polymer component are miscible with each other. The metal oxide particles are unevenly distributed in a thickness direction of the polymer film with a relatively greater concentration of the metal oxide particles being located toward at least one of a surface portion of the polymer film and an other surface portion of the polymer film that is opposite the surface portion in the thickness direction. The first polymer component is hydrophilic, and the second polymer component is hydrophobic relative to the first polymer component. A proportion of the first polymer component gradually decreases from the surface portion to the other surface portion. The surface portion is a portion of the polymer film located closest to the polarization means.

In the optical member and the polarization member, according to an aspect of another exemplary embodiment, a hydrophilicity of the first component is greater than that of the substrate, a hydrophilicity of the substrate is greater than that of the second component, and a hydrophilicity of the second component is greater than that of the metal oxide particles.

According to an aspect of still another exemplary embodiment, a coating solution for forming a polymer film includes a first component of at least one of a monomer and an oligomer, wherein the monomer and the oligomer each include an acrylamide skeleton and at least one photopolymerizable functional group in one molecule; a second component of a monomer including at least two photopolymerizable functional groups in one molecule; metal oxide particles; and a solvent in which the first component, the second component, and the metal oxide particle are dissolved and/or dispersed.

That is, the coating solution for forming a polymer film includes the first component, the second component, the metal oxide particles, and the solvent. The first component is at least one of a monomer and an oligomer, wherein the monomer and the oligomer each include an acrylamide skeleton and at least one photopolymerizable functional group in one molecule. The second component is a monomer including at least two photopolymerizable functional groups in one molecule. The first component, the second component, and the metal oxide particles are dispersed and/or dissolved in the solvent. A hydrophilicity of the first component is greater than that of the second component and a hydrophilicity of the second component is greater than that of the metal oxide particles.

The coating solution for forming a polymer film may further include an antistatic agent and a polymerization initiator.

According to an aspect of still another exemplary embodiment, a method of forming a polymer film includes a coating solution preparation process for preparing a coating solution for forming a polymer film; a coating process for coating the coating solution on a substrate for forming the polymer film; a drying process for drying the coated coating solution to form a coating film; and a curing process for curing the coating film to form the polymer film.

In the coating solution preparation process, as described above, the coating solution for forming a polymer film is prepared, which includes a first component, a second component, metal oxide particles, and a solvent. The first component is at least one of a monomer and an oligomer, wherein the monomer and the oligomer each include an acrylamide skeleton and at least one photopolymerizable functional group in one molecule. The second component is a monomer including at least two photopolymerizable functional groups in one molecule. The first component is hydrophilic. The first component, the second component, and the metal oxide particles are dispersed and/or dissolved in the solvent. A hydrophilicity of the first component is greater than that of the second component and a hydrophilicity of the second component is greater than that of the metal oxide particles. The solvent may include a first solvent having a relatively low boiling point and a second solvent having a relatively high boiling point. The first solvent may be isopropyl alcohol, and the second solvent may be diacetone alcohol.

The coating solution preparation process may be performed by following (i), (ii), and (iii) steps in this stated order to mix the first component, the second component, the metal oxide particles, and the solvent, thereby preparing a coating solution: (i) The first component is mixed with the first solvent, and the second component is mixed with the second solvent. (ii) The metal oxide particles are added to and mixed with a mixture of the second component and the second solvent. (iii) A mixture of the first component and the first solvent is mixed with a mixture of (ii).

The coating solution may further include an antistatic agent and a polymerization initiator. The antistatic agent may be mixed with at least one of the first component, the first solvent, and a mixture of the first component and the first solvent. The polymerization initiator may be mixed with at least one of the second component, the second solvent, and a mixture of the second component and the second solvent. In the coating solution, a total weight of the first component, the second component, the metal oxide particles, the antistatic agent, and the polymerization initiator may be in a range of about 1 part by weight or greater and about 80 parts by weight or less, based on 100 parts by weight of the coating solution.

In the coating process, the coating solution is coated on the substrate to form a polymer film.

In the drying process, a proportion of the first component gradually decreases from the surface portion located toward the substrate to the other surface portion opposite the surface portion, such that phase separation between the first component and the second component may occur.

In the curing process, the first component is photopolymerized with the second component to form a polymer film. That is, via the curing process, the coating film may be cured to form a polymer film or a polymer layer.

BRIEF DESCRIPTION OF THE DRAWINGS

These and/or other aspects will become apparent and more readily appreciated from the following description of the exemplary embodiments, taken in conjunction with the accompanying drawings in which:

FIG. 8 is a table that illustrates properties of Examples and Comparative Examples;

FIG. 9 is a table that illustrates properties of Examples and Comparative Examples;

FIG. 10 is a table that illustrates properties of Examples and Comparative Examples; and FIG. 11 is a table that illustrates properties of Examples and Comparative Examples;

DETAILED DESCRIPTION

Figure 1A:
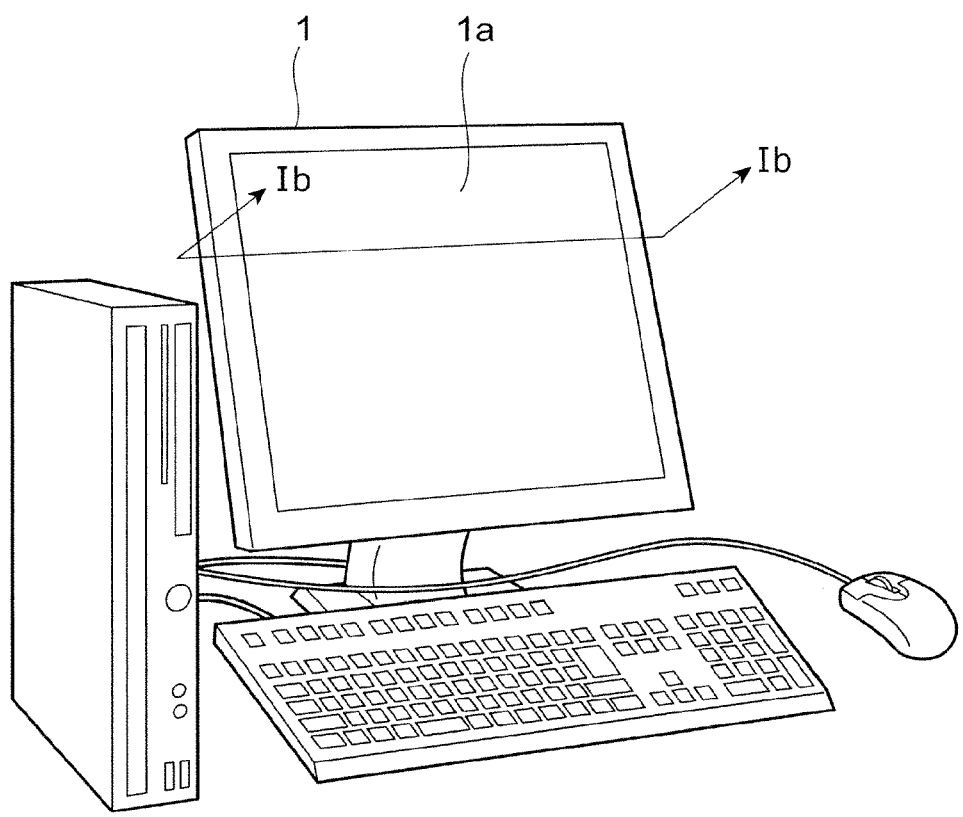
FIG. 1A is a view that illustrates an exemplary embodiment of a display device.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. Further, as used herein and in the claims, where the term "about" is used with a numerical value, the numerical value may vary by ±50%. The variation may also be ±40%, ±30%, ±20%, ±10%, ±5%, ±4%, ±3%, ±2% or ±1%.

Hereinafter, reference will now be made in detail to exemplary embodiments. In this regard, one or more exemplary embodiments may have different forms within the scope of the present disclosure and should not be construed as being limited to the descriptions set forth herein. The accompanying drawings, which are included to provide a further understanding, illustrate exemplary embodiments and are not necessarily drawn to actual scale.

<Description of Display Device>

FIG. 1A is a view that illustrates an exemplary embodiment of a display device. Examples of the display device 1 include a liquid crystal display for a personal computer (PC) and a liquid crystal television. The display device 1 displays an image on a display screen 1a.

<Description of Liquid Crystal Panel>

Figure 1B:
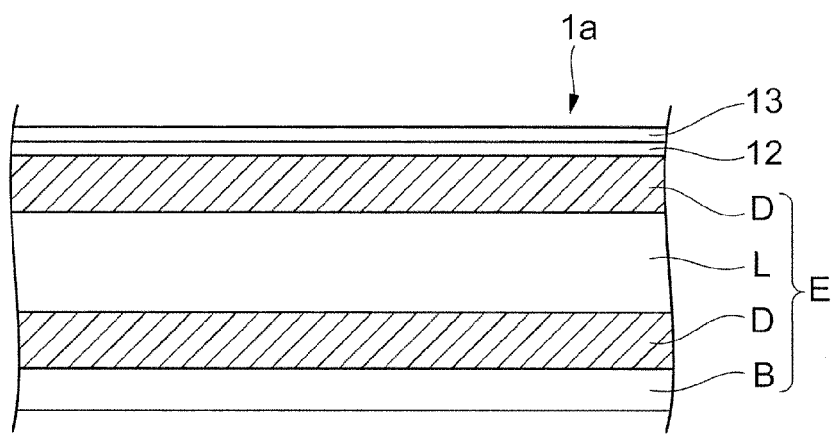
FIG. 1B is a cross-sectional view, taken along line Ib-Ib of FIG. 1A, which illustrates an exemplary embodiment of a structure of a display screen.

FIG. 1B is a cross-sectional view, taken along line Ib-Ib of FIG. 1A, which illustrates an exemplary embodiment of a structure of the display screen 1a.

The display screen 1a includes a liquid crystal panel E; and a hard coat layer 12 (the polymer film or polymer layer above) and a low refractive layer 13 formed on a surface of the liquid crystal panel E. The liquid crystal panel E is an example of a display means, e.g., a display, that displays an image. As shown in the drawing, the liquid crystal panel E includes a liquid crystal L; polarization films D disposed on and under the liquid crystal L; and a backlight B disposed under the lower polarization film D.

The upper and lower polarization films D are examples of a polarizing means, e.g., polarization layer, that polarizes light, and directions of light being polarized by the upper and lower polarization films D may be perpendicular to each other. For example, the polarizing films D may include a polymer film including molecules of an iodine compound in a polyvinyl alcohol (PVA). Also, the polymer film is inserted between, and is bonded to, two polymer films formed of triacetyl cellulose (TAC). Light is polarized by the molecules of an iodine compound included in the polarization films D. Examples of the backlight B include a cold cathode fluorescent lamp or a white light-emitting diode (LED).

A power source (not shown) is connected to the liquid crystal L, and when a voltage is applied by the power source, an arrangement direction of the liquid crystal L changes. When light is emitted from the backlight B, light is first transmitted through the lower polarization film D, and thus light is polarized. When the liquid crystal panel E is a TN-type liquid crystal panel, the polarized light is transmitted through the liquid crystal panel E while the voltage is applied to the liquid crystal panel E. The upper polarization film D has a different polarizing direction and thus blocks the polarized light. A polarizing direction of the polarized light rotates 90° according to a function of the liquid crystal panel E when a voltage is not applied to the liquid crystal panel E. In this regard, the upper polarization film D does not block the polarized light and transmits the polarized light. Thus, an image may be displayed by controlling light transmission according to whether a voltage is applied to the liquid crystal panel E or not. A color image (not shown) may be displayed by using a color filter. Here, the polarization film D with the hard coat layer 12 and the low refractive layer 13 is an example of a polarizing member.

Figure 1C:
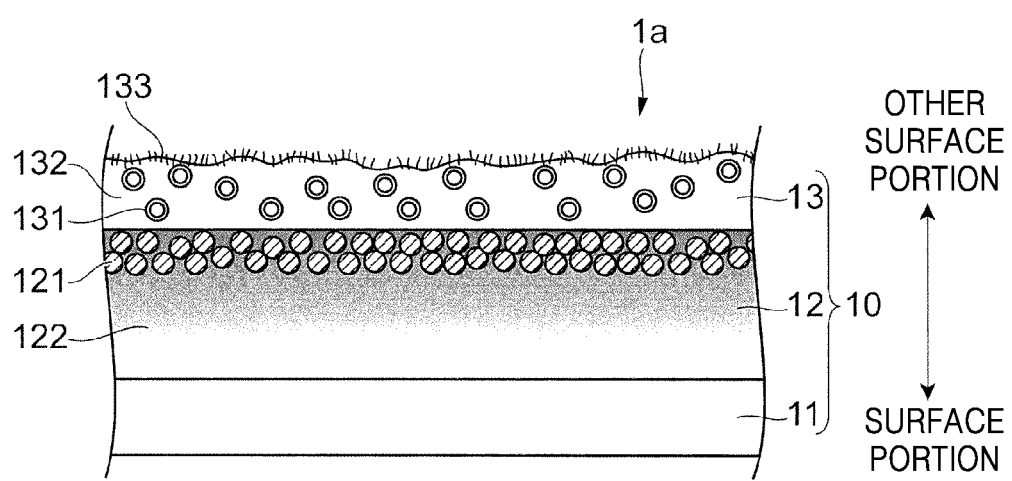
FIG. 1C is an enlarged view of FIG. 1B, the enlarged view showing an outermost portion of the display screen.

FIG. 1C is an enlarged view of FIG. 1B and illustrates an outermost portion of the display screen 1a.

In FIG. 1C, the substrate 11, the hard coat layer 12, and the low refractive layer 13 are shown. The substrate 11 is the outermost layer of the polarization film D. In some exemplary embodiments, one of the substrate 11, the hard coat layer 12, and the low refractive layer 13 may be used as a protection film 10. When the substrate 11, the hard coat layer 12, and the low refractive layer 13 are used as the protection film 10, the protection film 10 protects the polarization film D. In this case, the protection film 10 is an example of an optical member in this exemplary embodiment.

The substrate 11 may be a supporting member for forming the hard coat layer 12 and the low refractive index layer 13. The substrate 11 may be a transparent substrate having total luminous transmittance of about 85% or higher. The substrate 11 may be, for example, TAC as described above. However, exemplary embodiments are not limited thereto. In some exemplary embodiments, the substrate 11 may be polyethylene terephthalate (PET). However, in this exemplary embodiment, the substrate 11 may advantageously be TAC. The substrate 11 may have a thickness, for example, in a range of about 20 micrometers (μm) or greater and about 200 μm or less.

The hard coat layer 12 may be a functional layer for preventing scratches on the substrate 11. The hard coat layer 12 has a structure that contains metal oxide particles 121 in a binder 122 as a base material, wherein the binder 122 has a polymer as a main component. When the metal oxide particles 121 are contained in the binder, a hard coat property may be imparted to the hard coat layer 12. In this exemplary embodiment, the hard coat layer 12 may have a thickness of about 1 μm to about 15 μm, for example, about 1 μm to about 11 μm. In this exemplary embodiment, examples of the metal oxide particles 121 may include tin oxide, titanium oxide, or cerium oxide.

When a thickness of the hard coat layer 12 is less than about 1 μm, it may be hard to prevent the substrate 11 from having scratches thereon. When a thickness of the hard coat layer 12 is greater than about 15 μm, the hard coat layer 12 may have a low refractive index. That is, as described below, the low refractive index layer 13 is a layer for suppressing reflection, and to this end, it is desirable that a difference between a refractive index of the hard coat layer 12 and that of the low refractive index layer 13 is relatively great. In some exemplary embodiments, it may be desirable that a refractive index of the hard coat layer 12 may be relatively great, and a refractive index of the low refractive index layer 13 may be relatively small. When a refractive index of the hard coat layer 12 is relatively small, it may be hard for the low refractive index layer 13 to suppress reflection.

Figure 2:
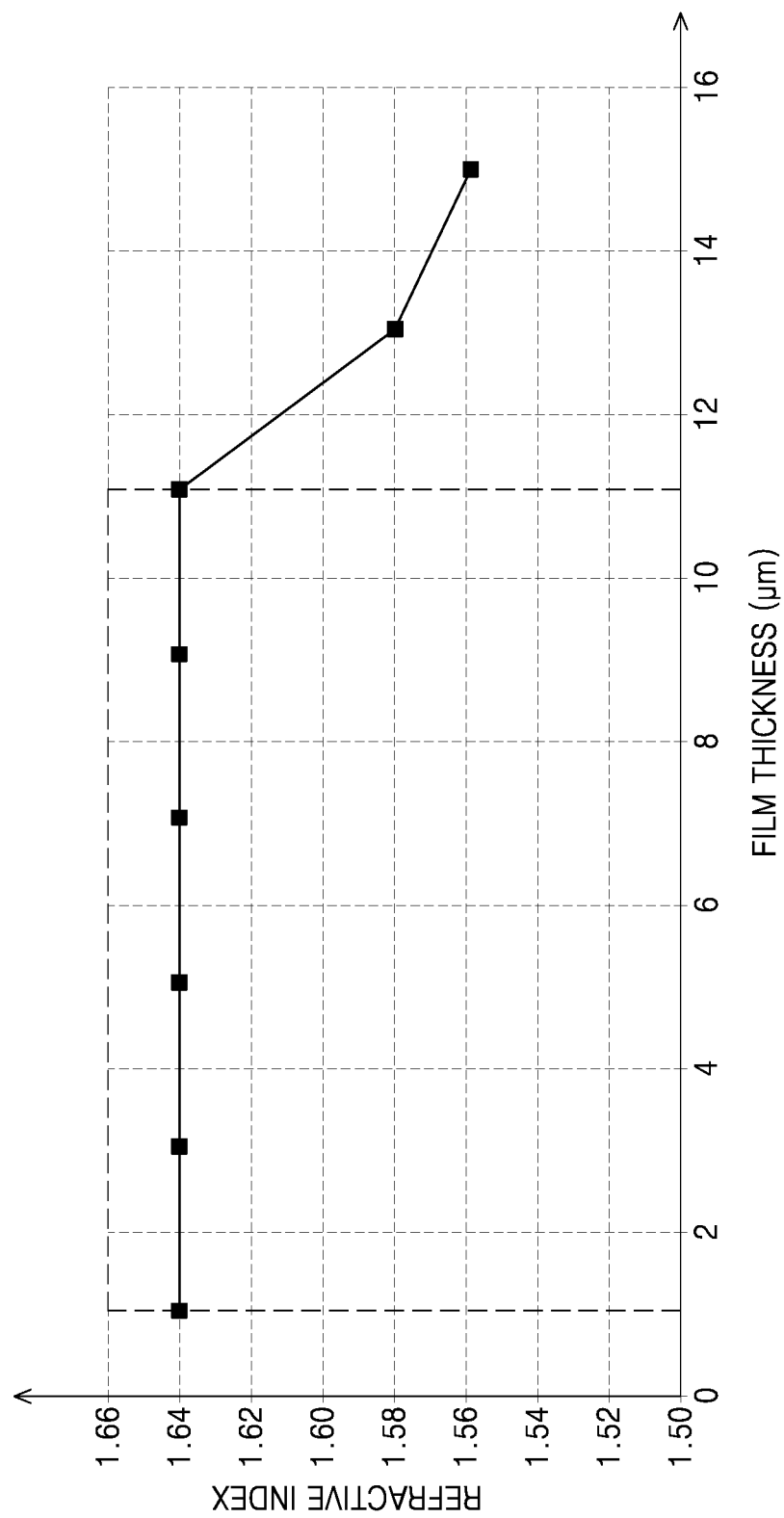
FIG. 2 is a graph showing the relationship between a thickness of a hard coat layer and a refractive index.

FIG. 2 is a graph showing the relationship between a thickness of the hard coat layer 12 and a refractive index.

In FIG. 2, the x-axis represents a film thickness of the hard coat layer 12, and the y-axis represents a refractive index of the hard coat layer 12. As shown in FIG. 2, when a thickness of the hard coat layer 12 is in a range of about 1 μm to about 11 μm, the refractive index thereof is about 1.64. However, when a thickness of the film greater than 11 μm, the refractive index gradually decreases. When a thickness of the film is excessively great, it may be hard to cause phase separation as is described below.

The low refractive index layer 13 is a functional layer for preventing reflection while being irradiated with light from an external source. The low refractive index layer 13 has a structure that contains hollow silica particles 131 in a binder 132, wherein the binder 132 has a polymer as a main component. A fluorine-containing polymer layer 133 is disposed on the other surface portion (the upper side in FIG. 1C) of the low refractive index layer 13.

The low refractive index layer 13 may have a refractive index of, for example, about 1.50 or less. In this exemplary embodiment, the low refractive index layer 13 may have a thickness of, for example, about 100 nm to about 150 nm.

Each of the hollow silica particles 131 may have an outer portion of silica (silicon dioxide, $SiO_2$) in an approximately spherical form. Each of the hollow silica particles 131 may have a hollow portion therein. The hollow silica particles 131 may have a median particle diameter in a range of about 10 nm to about 120 nm. By including the hollow silica particles 131, the low refractive index layer 13 may have a low refractive index. Accordingly, the low refractive index layer 13 may have a function of preventing reflection while being irradiated with light from an external source.

The binder 132 of the low refractive index layer 13 may have a network structure which connects the hollow silica particles 131 to one another. The binder 132 includes, for example, a photocurable fluorine-containing polymer. The photocurable fluorine-containing polymer is prepared by photopolymerizing a photopolymerizable fluorine-containing monomer.

The fluorine-containing polymer layer 133 may include a fluorine polymer. The fluorine polymer may be prepared by photopolymerizing a photopolymerizable fluorine-containing polymer. The fluorine polymer is an additive which imparts an antifouling property and a slippery property to the low refractive layer 13.

<Description of Structure of Hard Coat Layer>

Hereinafter, the hard coat layer 12 (also referred to herein as the polymer film or polymer layer) will be described in detail.

Figure 3A:
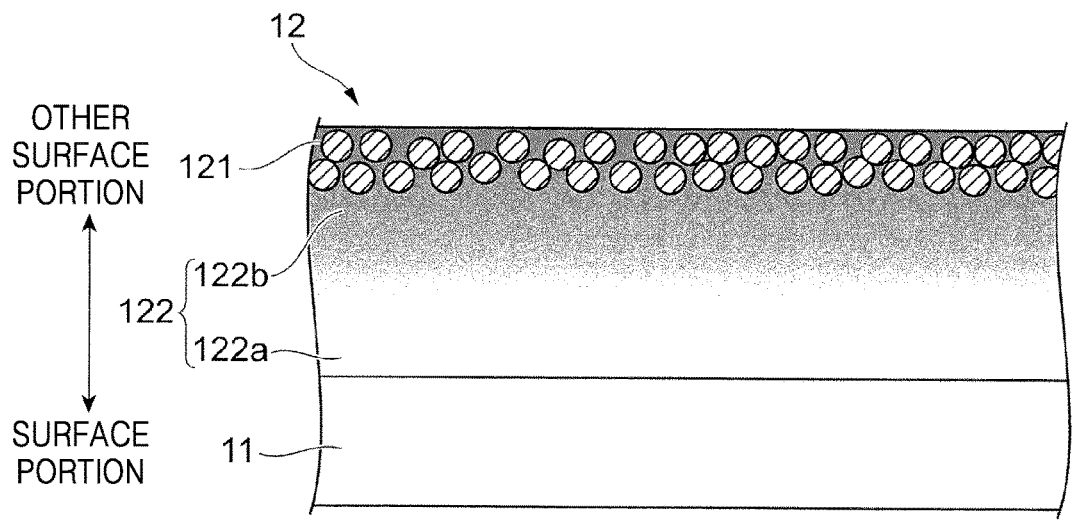
FIG. 3A illustrates an exemplary embodiment of a structure of a hard coat layer.

FIG. 3A illustrates an exemplary embodiment of a structure of the hard coat layer or hard coat film 12. As described above, the hard coat layer 12 has a structure that contains the metal oxide particles 121 in the binder 122.

In this exemplary embodiment, the metal oxide particles 121 are unevenly distributed with a greater concentration toward at least one of a surface portion and the other surface portion opposite the surface portion. Here, the surface portion indicates the substrate 11 side of the hard coat layer 12, i.e., the lower side in FIG. 3A. The other surface portion is opposite the substrate 11 side of the hard coat layer 12 (the low refractive index layer 13 side), i.e., the upper side in FIG. 3A. FIG. 3A illustrates an example where the metal oxide particles 121 are unevenly distributed with a greater concentration toward the other surface portion (the upper side in FIG. 3A). In FIG. 3A, the metal oxide particles 121 may have, for example, a thickness of about 500 nm or less, in some exemplary embodiments, a thickness in a range of about 100 nm to about 200 nm, and in some exemplary embodiments, a thickness of about 150 nm.

By localizing the metal oxide particles 121 in this portion, the refractive index may increase. Accordingly, a difference between a refractive index of the hard coat layer 12 and that of the low refractive index layer 13 becomes greater. Consequently, the low refractive index layer 13 may exhibit improved suppression effects of reflection.

The localization of the metal oxide particles 121 toward the other surface portion (the upper side in FIG. 3A) results from the hydrophobicity of the metal oxide particles 121. Therefore, the metal oxide particles 121 may bleed out from a first polymer component 122a, which is hydrophilic and described below. Accordingly, the metal oxide particles 121 may be localized toward the other surface portion (the upper side in FIG. 3A) having the lowest concentration of the first polymer component 122a.

In some exemplary embodiments, a surface of the metal oxide particles 121 may be treated to thereby render the surface of the metal oxide particles 121 hydrophilic. In this case, the metal oxide particles 121 may bleed out from a second polymer component 122b, which is hydrophobic and described below. Accordingly, in such a case, the metal oxide particles 121 may be localized toward the surface portion (the lower side in FIG. 3A) having the lowest concentration of the second polymer component 122b.

In some exemplary embodiments, by using a combination of metal oxide particles 12 having hydrophobicity and metal oxide particles 12 having hydrophilicity, the metal oxide particles 121 may be localized toward both the surface portion (the lower side in FIG. 3A) and other surface portion (the upper side in FIG. 3A).

The binder 122 includes both the first polymer component 122a, which is hydrophilic, and the second polymer component 122b, which is hydrophobic relative to the first polymer component 122a. The first polymer component 122a and the second polymer component 122b may be miscible with each other. In addition, a proportion of the first polymer component 122a gradually decreases from the surface portion (the lower side in FIG. 3A) to the other surface portion (the upper side in FIG. 3A) opposite the surface portion. In contrast, a proportion of the second polymer component 122b gradually increases from the surface portion (the lower side in FIG. 3A) to the other surface portion (the upper side in FIG. 3A). That is, the first polymer component 122a is mainly distributed toward the surface portion (the lower side in FIG. 3A), and the second polymer component 122b is mainly distributed toward the other surface portion (the upper side in FIG. 3A).

A distribution of the first polymer component 122a mainly toward the surface portion (the lower side in FIG. 3A) can result from a high affinity thereof for the substrate 11. For example, TAC may be used in the substrate 11, and TAC is hydrophilic. Accordingly, the first polymer component 122a, which is also hydrophilic, is mainly distributed toward the substrate 11 (the lower side in FIG. 3A). The second polymer component 122b is hydrophobic. Accordingly, affinity of the second polymer component 122b with the first polymer component 122a and the substrate 11 is not high. Consequently, phase separation between the second polymer component 122b and the first polymer component 122a may occur, and thus the second polymer component 122b is mainly distributed toward the other surface portion (the upper side in FIG. 3A) opposite the substrate 11.

However, in exemplary embodiments, a phase of the first polymer component 122a is not completely separated from that of the second polymer component 122b.

Figure 3B:
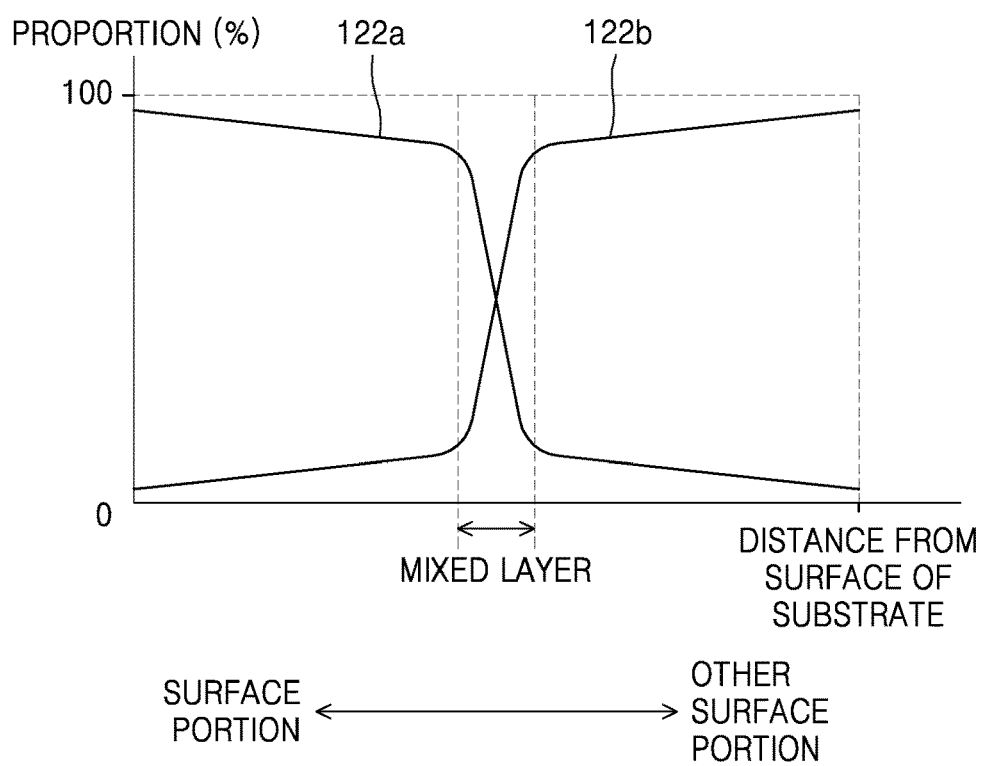
FIG. 3B illustrates a proportion of each of a first polymer component and a second polymer component along a thickness direction of the layer or film.

FIG. 3B illustrates a proportion of each of the first polymer component 122a and the second polymer component 122b along a thickness direction of the layer or film. In FIG. 3B, the x-axis represents a length of the thickness direction of the film, i.e., a distance from the surface of the substrate 11. The y-axis represents the proportion of the first polymer component 122a and the second polymer component 122b. As shown in FIG. 3B, the first polymer component 122a occupies most of a region near the substrate 11 (a region having a relatively short distance from the substrate 11), and the second polymer component 122b scarcely exists therein. The second polymer component 122b occupies most of a region relatively far from the substrate 11 (a region having a relatively great distance from the substrate 11), and the first polymer component 122a scarcely exists therein. Between the foregoing two regions, a mixed layer is present where a proportion of the first polymer component 122a and that of the second polymer component 122b abruptly alternates. That is, in the mixed layer, the first polymer component 122a and the second polymer component 122b are miscible with each other.

Due to the presence of this mixed layer, it may be possible to prevent the first polymer component 122a and the second polymer component 122b from forming a sea-island structure. In other words, when a complete phase separation occurs, it may be easy to form a structure where the second polymer component 122b is distributed in the form of islands in the first polymer component 122a. In some exemplary embodiments, it may be easy to form a structure where the first polymer component 122a is distributed in the form of islands in the second polymer component 122b.

An amount of the first polymer component 122a in the hard coat layer 12 is about 20 percent by weight (wt %) or greater based on a total weight of the hard coat layer 12. An amount of the second polymer component 122b in the hard coat layer 12 is about 5 wt % or greater based on a total weight of the hard coat layer 12. Accordingly, it may be easy to form a structure where a phase of the first polymer component 122a is separated from that of the second polymer component 122b, as shown in FIG. 3A.

Figure 4:
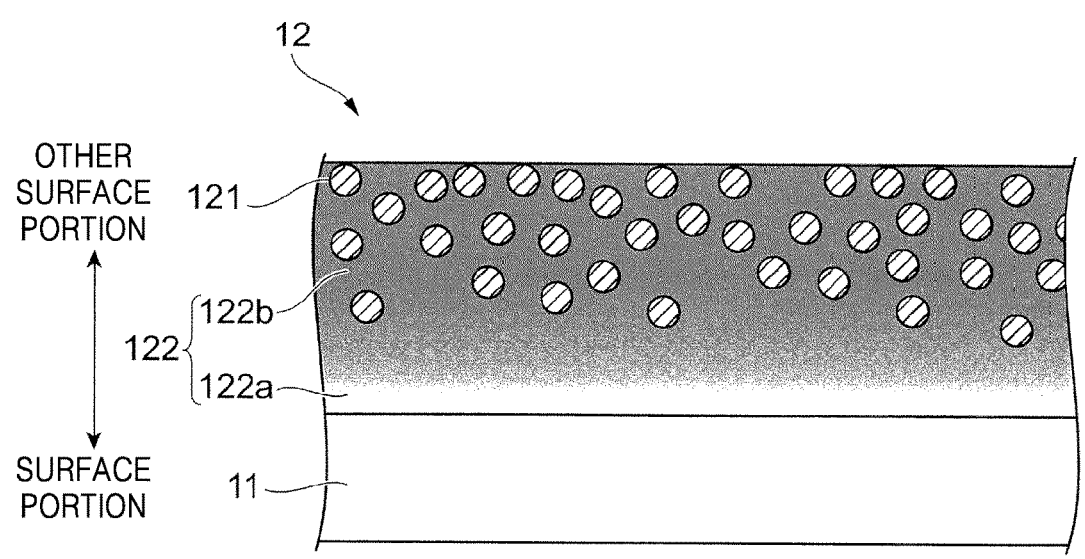
FIG. 4 illustrates another exemplary embodiment of a structure of a hard coat layer.

FIG. 4 illustrates another exemplary embodiment of a structure of the hard coat layer 12. The hard coat layer 12 as illustrated may be formed when an amount of the first polymer component 122a is less than about 20 wt % in the hard coat layer 12. In addition, the hard coat layer 12 as illustrated may be formed when an amount of the second polymer component 122b is less than about 5 wt % in the hard coat layer 12. In this case, although a mixed layer is present therein, the metal oxide particles 121 is likely to be dispersed toward the surface portion (the lower side in FIG. 4). Consequently, as compared with FIG. 3A, the metal oxide particles 121 may be distributed toward the surface portion (the lower side in FIG. 4) as well as toward the other surface portion (the upper side in FIG. 4). In this case, a refractive index of the other surface portion (the upper side in FIG. 4) may become relatively low, as compared with that in FIG. 3A.

The hard coat layer 12 may further have an antistatic function. When the hard coat layer 12 includes an antistatic function, dust in the air may not attach well to the hard coat layer 12, and dirt may not easily accumulate on the hard coat layer 12 when the display device 1 is used. In addition, dust in the air may not easily attach to the hard coat layer 12 when the hard coat layer 12 is formed on the substrate 11. Thereby, the hard coat layer 12 may be formed easily, and the yield may easily improve during the formation of the hard coat layer 12.

When manufacturing the display device 1, a product protection film, also as called as a protect film, may be affixed to the display screen 1a. The product protection film protects the liquid crystal panel E and prevents contamination when shipping and distributing the display device 1. The product protection film is affixed to the top of the hard coat layer 12 or the low refractive index layer 13. When a user uses the display device 1, the product protection film may be detached. However, when a user detaches the product protection film, static electricity is generated, which may cause scratches on the hard coat layer 12 and the low refractive index layer 13. When the hard coat layer 12 has an antistatic function, this phenomenon may be suppressed. In this respect, the hard coat layer 12 may have an antistatic function. Accordingly, the hard coat layer 12 in this exemplary embodiment further includes an antistatic agent.

Since an antistatic agent is hydrophobic, the antistatic agent is unevenly distributed with a greater concentration toward the other surface portion (the upper side in FIG. 3A), in addition to the metal oxide particles 121. In other words, distribution of the antistatic agent is nearly the same as that of the metal oxide particles 121. Thus, an amount of the antistatic agent added may be further reduced. For example, a similar degree of an antistatic function may be exhibited even at an addition amount of ⅕, as compared with a case where the antistatic agent is not localized.

As described below, the first polymer component 122a and the second polymer component 122b may be formed by photopolymerizing a monomer or an oligomer of a raw material. Therefore, the hard coat layer 12 may further include a photopolymerization initiator as a polymerization initiator for polymerizing the monomer or the oligomer.

<Description of Method of Forming Hard Coat Layer>

The method of forming the hard coat layer 12 in this exemplary embodiment includes a process of coating a coating solution for forming the hard coat layer 12 on the substrate 11. The coating solution includes the metal oxide particles 121, a monomer (or an oligomer) that will form or constitute the binder 122, and an antistatic agent. The monomer (or the oligomer) may include a first component and a second component as described below. The coating solution may further include a photopolymerization initiator. The coating solution may include a solvent that dissolves and/or disperses these components above.

(Metal Oxide Particles)

The metal oxide particles 121 are not particularly limited as long as the metal oxide particles 121 are fine particles made of a metal oxide. Examples of the metal oxide particles 121 include at least one selected from antimony pentoxide ($Sb_2O_5$), antimony trioxide ($Sb_2O_3$), zirconium oxide ($ZrO_2$), titanium oxide ($TiO_2$), tin oxide ($SnO_2$), and cerium oxide ($CeO_2$).

The metal oxide particles 121 may have a median diameter of about 500 nm or less, e.g., a median diameter in a range of about 100 nm to about 200 nm, and in some exemplary embodiments, a median diameter in a range of about 1 nm to about 30 nm. The metal oxide particles 121 may be, for example, in spherical form, but exemplary embodiments are not limited thereto. The metal oxide particles 121 may be, for example, in a needle-shape form, in a chain-shaped form in which particles are interconnected, or in an irregular or random form. The metal oxide particles 121 may also have a mixed form.

The metal oxide particles 121 may be surface-treated, or the metal oxide particles 121 may not be surface-treated. That is, a surface of the metal oxide particles 121 may be such that metal oxide is exposed. However, when the metal oxide particles 121 are imparted with hydrophilicity as described above, a surface treatment may be performed.

An amount of the metal oxide particles 121 may be in a range of about 0.1 parts to about 10 parts by weight based on 100 parts by weight of the total weight of the hard coat layer 12. When an amount of the metal oxide particles 121 is less than about 0.1 parts by weight, a hard coat property of the hard coat layer 12 may be poor. Consequently, it is hard for the hard coat layer 12 to exhibit a function that prevents the substrate 11 from being scratched. When an amount of the metal oxide particles 121 is greater than about 10 parts by weight, much optical interference may occur in a visible light region due to an increase in film thickness of a localized portion. Therefore, the optical interference is likely to be recognized as a stain from the perspective of an observer. This is a factor of cosmetic defect or appearance defect.

(First Component)

The first polymer component 122a in the binder 122 is based on at least one of a monomer and an oligomer (the first component). The monomer or the oligomer has an acrylamide skeleton and at least one photopolymerizable functional group in a molecule. The first component is hydrophilic. The term "hydrophilicity" as used herein refers to a solubility with respect to water of about 20 wt % or greater.

Hydrophilicity is a property of being easily dissolved in water or easily mixed with water by forming a hydrogen bond with water. This phenomenon is thermodynamically favorable (reducing free energy). A hydrophilic molecule is soluble in polar solvents in addition to water. A hydrophilic molecule or a hydrophilic group may form a hydrogen bond due to its polarity. Thus, a hydrophilic molecule may be more soluble in water than in oil or a hydrophobic solvent. A hydrophilic molecule may be, for example, methanol, ethanol, propanol, or the like. A hydrophilic group may be, for example, a carboxylic group or an carboxylic acid residue in a fatty acid or the like.

Due to the acrylamide skeleton, the first component is hydrophilic. The first component may be at least one of a monomer and an oligomer, or a mixture of the monomer and the oligomer. A molecular weight of the first component may be 1,000 or less. Accordingly, in forming the hard coat layer 12, the first component may easily move within the layer, and phase separation with respect to the second component may easily occur. Thus, it may be easy to form a structure where a phase of the first polymer component 122a is separated from that of the second polymer component 122b, as shown in FIG. 3A.

Formula (1) below represents an acrylamide skeleton. The first component may be a primary amide represented by Formula (2) ($R^1$—$NH_2$), a secondary amide represented by Formula (3) ($R^1$—$NHR^2$), or a tertiary amide represented by Formula (4) ($R^1$—$NR^2R^3$). Here, $R^1$ may be an acryloyl group or a methacryloyl group. $R^2$ and $R^3$ may each independently be, for example, a $C_1$-$C_{18}$ alkyl group, a $C_1$-$C_{12}$ alkyl group, a $C_1$-$C_6$ alkyl group, or a $C_1$-$C_4$ alkyl group. The alkyl group may be a linear alkyl group, a branched alkyl group, or a cyclic alkyl group.

Examples of the compounds represented by one of Formulae (2) to (4) include (meth)acrylamides, such as (meth)acrylamide, N-alkyl (meth)acrylamide, (meth)acrylamides containing an amino group or N,N-dialkyl (meth)acrylamide, etc. Examples of N-alkyl (meth)acrylamides may include N-ethyl (meth)acrylamide, N-n-butyl (meth)acrylamide, or N-octyl acrylamide. Examples of (meth)acrylamides containing an amino group include dimethylaminoethyl (meth)acrylamide or diethylaminoethyl (meth)acrylamide. Examples of N,N-dialkyl (meth)acrylamides include N,N-dimethyl (meth)acrylamide, N,N-diethyl (meth)acrylamide, N,N-dipropyl (meth)acrylamide, N,N-diisopropyl (meth)acrylamide, N,N-di(n-butyl) (meth)acrylamide, and N,N-di(t-butyl) (meth)acrylamide.

(1)

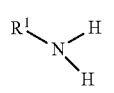
(2)

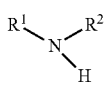
(3)

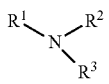
(4)

The first component may be, for example, at least one selected from N,N-dimethyl acrylamide (DMAA), N,N-diethyl acrylamide (DEAA), N-n-butoxymethyl acrylamide (NBMA), N,N'-methylene bisacrylamide (MBAA), N-methoxymethyl acrylamide (NMMA), and N-isobutoxymethyl acrylamide (IBMA). In some exemplary embodiments, the first component may be, for example, at least one selected from N-(2-hydroxyethyl) acrylamide (HEAA), 4-acryloyl morpholine (ACMO), diacetone acrylamide (DAMM), and N-t-butyl acrylamide (TBAA).

An amount of the first component may be in a range of about 20 parts to about 90 parts by weight based on 100 parts by weight of the total weight of the hard coat layer 12. When the first component is less than about 20 parts by weight or greater than about 90 parts by weight, phase separation as shown in FIG. 3A may be hard to occur.

(Second Component)

A monomer (the second component), which includes at least two photopolymerizable functional groups in a molecule, forms or constitutes the second polymer component 122b in the binder 122. The second component is hydrophobic relative to the first component. The term "hydrophobicity" as used herein refers to a solubility with respect to water of about 10 wt % or less.

Hydrophobicity is a property of a material or (a part of) a molecule having relatively low affinity for water, i.e., insoluble in water or immiscible with water. A hydrophobic material is in general an electrically neutral nonpolar material. An example thereof is a material having a hydrocarbon group in a molecule. The term "lipophilic", which indicates the affinity between lipid and a nonpolar organic solvent, is often used as a synonym for hydrophobicity; however, hydrophobic materials are not all lipophilic. For example, compounds with silicon and fluoroalkyl chains are some exceptions.

A molecular weight of the second component may be about 3,000 or less, and in some exemplary embodiments, about 2,000 or less. Accordingly, in forming the hard coat layer 12, the second component may easily move within the layer, and phase separation with the first component may easily occur. Thus, it may be easy to form a structure where a phase of the first polymer component 122a is separated from that of the second polymer component 122b, as shown in FIG. 3A.

Examples of the second component include at least one selected from pentaerythritol tetraacrylate (TMMT), dipentaerythritol hexaacrylate, tricyclodecane dimethanol diacrylate (DCPA), ethoxylated isocyanuric acid triacrylate, ethoxylated isocyanuric acid diacrylate, trimethylol propane triacrylate (TMPTA), and pentaerythritol triacrylate.

The binder 122 is a product of mixing and photopolymerizing of the first component and the second component. When the first component and the second component are mixed with each other and coated, phase separation between the first component and the second component may occur. Upon photopolymerization, the first component may photopolymerize with the second component. In addition, the first component may photopolymerize with other first components, or the second component may photopolymerize with other second components. Consequently, the binder 122 is formed as described above.

An amount of the second component may be in a range of about 5 parts to about 90 parts by weight, based on 100 parts by weight of the total weight of the hard coat layer 12. When the second component is less than about 5 parts by weight or greater than about 90 parts by weight, phase separation as shown in FIG. 3A may be hard to occur.

(Antistatic Agent)

The antistatic agent that imparts an antistatic function to the hard coat layer 12 is not particularly limited, and a commonly used antistatic agent may be used. For example, polyethylene dioxythiophene (PEDOT) or quaternary ammonium salt polymer may be used as an antistatic agent.

An amount of the antistatic agent may be in a range of about 0.1 parts to about 10 parts by weight, and in some exemplary embodiments, about 1.5 parts to about 3 parts by weight based on 100 parts by weight of the total weight of the hard coat layer 12. When an amount of the antistatic agent is less than about 0.1 parts by weight, the antistatic agent may not impart an antistatic function to the hard coat layer 12. When an amount of the antistatic agent is greater than about 10 parts by weight, the hard coat layer 12 may have an insufficient hard coat property. Consequently, it is hard for the hard coat layer 12 to exhibit a function that prevents the substrate 11 from being scratched. In addition, when an amount of the antistatic agent is greater than about 10 parts by weight, the hard coat layer 12 may have a poor light transmitting property, which may cause a haze.

Figure 5:
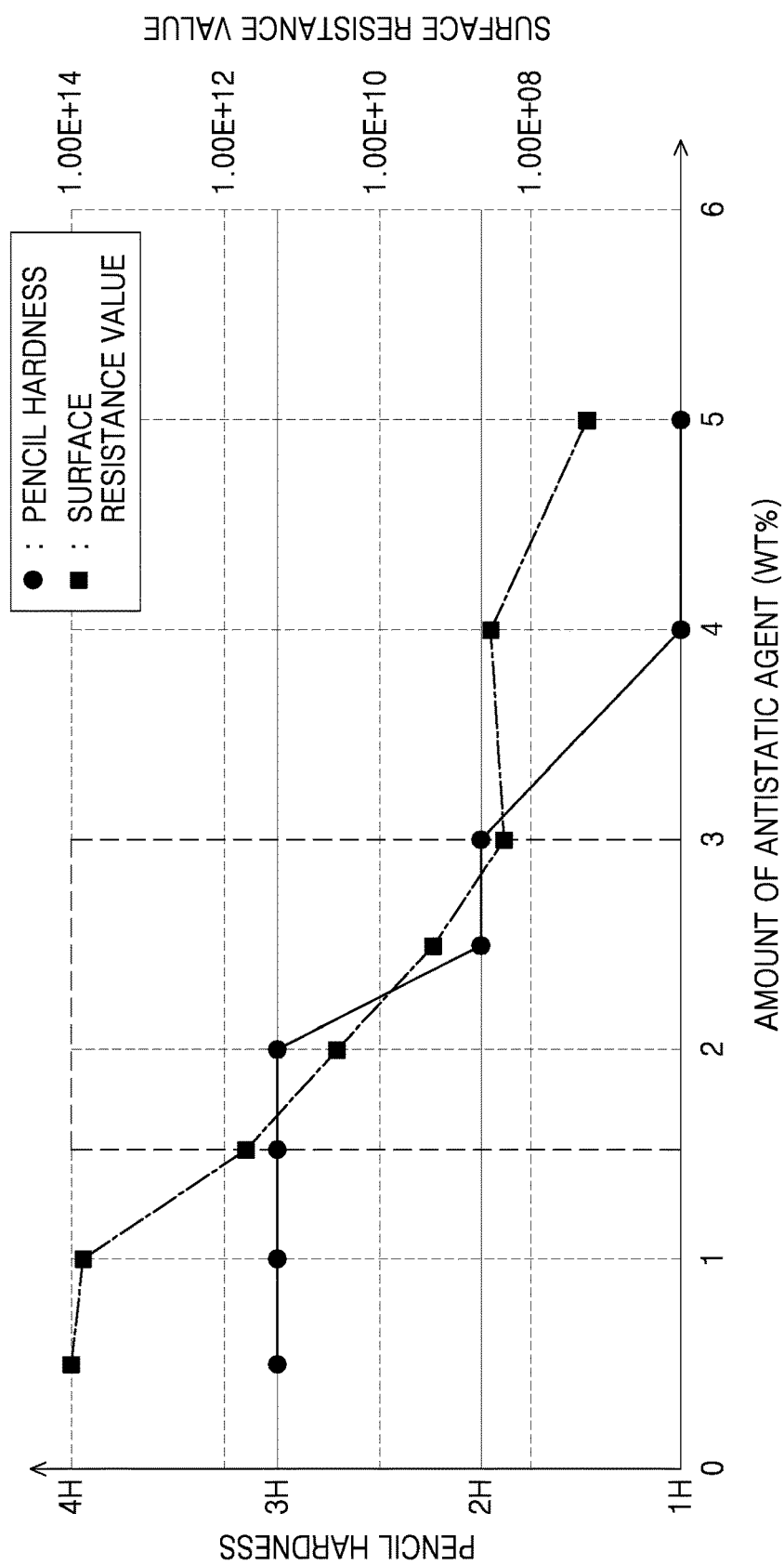
FIG. 5 is a graph showing the relationship between an amount of an antistatic agent, pencil hardness, and a surface resistance value.

FIG. 5 is a graph showing the relationship between an amount of an antistatic agent, pencil hardness, and a surface resistance value. In FIG. 5, the x-axis represents an amount of an antistatic agent. The y-axis represents a pencil hardness or a surface resistance value.

The pencil hardness is measured as follows: A pencil is installed at an angle of 45° with respect to the hard coat layer 12 such that a pencil lead presses the hard coat layer 12. The pencil lead is controlled to be exposed at a length of about 5 mm to about 6 mm. A front end part of the pencil lead is ground to be flattened by using sandpaper. A load of about 500 g is at the front end part of the pencil lead. The pencil is moved at a rate of about 0.8 millimeters per seconds (mm/s) and to a distance of at least about 7 millimeters (mm). Then, scratches made on the hard coat layer 12 are observed by the naked eye. These may be sequentially performed by changing the pencil and varying the hardness of the pencil lead from 6B to 6H. A hardness of the pencil lead that was the greatest hardness at which no scratches were made was determined as a pencil hardness. A greater pencil hardness indicates that the hard coat layer 12 is harder.

As shown in FIG. 5, as an amount of the antistatic agent increases, a surface resistance value decreases. That is, as an amount of the antistatic agent increases, it becomes more hard for the hard coat layer 12 to be charged. As an amount of the antistatic agent increases, a pencil hardness decreases. That is, as an amount of the antistatic agent increases, a hard coat property of the hard coat layer 12 deteriorates. In this respect, an amount of the antistatic agent may be in a range of about 1.5 parts by weight or greater and about 3 parts by weight or less. When an amount of the hard coat layer 12 is within these ranges, 2H or higher pencil hardness as well as satisfactory antistatic function may be achieved.

A method of imparting an antistatic function to the hard coat layer 12 is not limited to a method of adding the antistatic agent. For example, a conductive material may be added to the metal oxide particles 121. The conductive material is, for example, a metal element. More specifically, the conductive material is, for example, antimony (Sb) or phosphorus (P). In this case, examples of the metal oxide particles 121 to which the conductive material is added include antimony tin oxide (ATO) or phosphorus tin oxide (PTO). In addition, the conductive material is not limited to one kind, and two or more conductive materials may be added. Consequently, a surface resistance value of the hard coat layer 12 is lowered, and the hard coat layer 12 may be imparted with an antistatic function. Therefore, it may be unnecessary to add an antistatic agent.

(Photopolymerization Initiator)

A photopolymerization initiator is a compound that is added to initiate photopolymerization. Materials for the photopolymerization initiator are not particularly limited. For example, an α-hydroxyacetophenon-based photopolymerization initiator may be used. Examples of the α-hydroxyacetophenon-based photopolymerization initiator may include DAROCUR 1173, IRGACURE 184, IRGACURE 2959, and IRGACURE127 available from BASF Japan, Ltd. ESACURE KIP 150 available from DKSH Japan may also be used. Also, these may be used alone or as a combination of two or more selected therefrom.

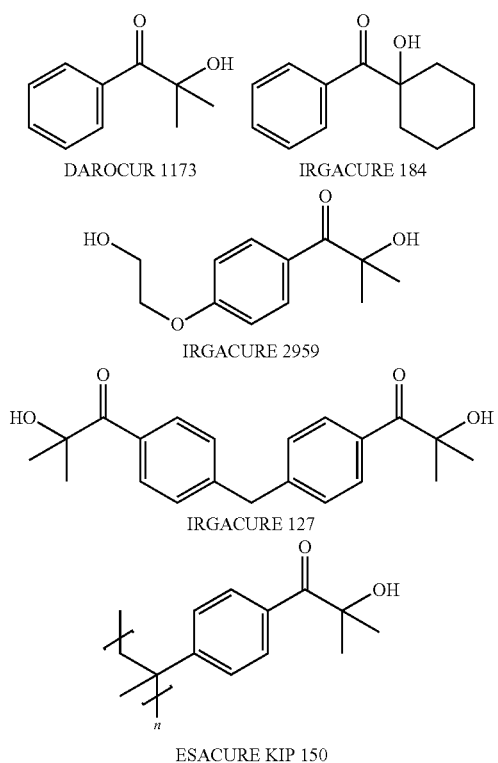

An amount of the photopolymerization initiator may be in a range of about 0.5 parts to about 10 parts by weight based on 100 parts by weight of the total weight of the hard coat layer 12. When an amount of the photopolymerization initiator is less than about 0.5 parts by weight, photopolymerization may not occur. When an amount of the photo- polymerization initiator is greater than about 10 parts by weight, the hard coat layer 12 may have an insufficient hard coat property. Consequently, it is hard for the hard coat layer 12 to exhibit a function that prevents the substrate 11 from being scratched.

Solvent

A solvent is not particularly limited. In some exemplary embodiments, for example, the solvent may be at least one selected from diacetone alcohol, ethylene glycol monoethyl ether, ethylene glycol monobutyl ether, propylene glycol monomethyl ether, methyl ethyl ketone (MEK), methyl acetate, dimethyl carbonate, and 1,3-dioxolane.

However, the solvent may include a first solvent having a relatively low boiling point and a second solvent having a relatively high boiling point. In one such exemplary embodiment, the first solvent is isopropyl alcohol, and the second solvent is diacetone alcohol. In this case, a boiling point of isopropyl alcohol is 83° C., and a boiling point of diacetone alcohol is 166° C.

In this exemplary embodiment, these two kinds of solvents are used, and a mixing ratio of each of the solvents may be adjusted. As a result, a degree of phase separation between the first component and the second component may be controlled in a drying process when forming the hard coat layer 12.

A hydrophilicity of the first component may be greater than that of the substrate 11, a hydrophilicity of the substrate 11 may be greater than that of the second component, and a hydrophilicity of the second component may be greater than that of the metal oxide particles 121. Accordingly, the first component may be more likely to be unevenly distributed with a greater concentration toward the substrate 11 (the surface portion). The second component may be more likely to be unevenly distributed with a greater concentration toward a side opposite the substrate 11 (the other surface portion). In addition, the metal oxide particles 121 as well as the second component may be more likely to be unevenly distributed with a greater concentration toward the side opposite the substrate 11 (the other surface portion).

Further, the low refractive index layer 13 may be hydrophobic relative to the binder 122 and the metal oxide particles 121. Accordingly, when forming the low refractive index layer 13, bondability thereof to the hard coat layer 12 may improve.

Next, a method of forming the hard coat layer 12 will be described in detail.

Figure 6:
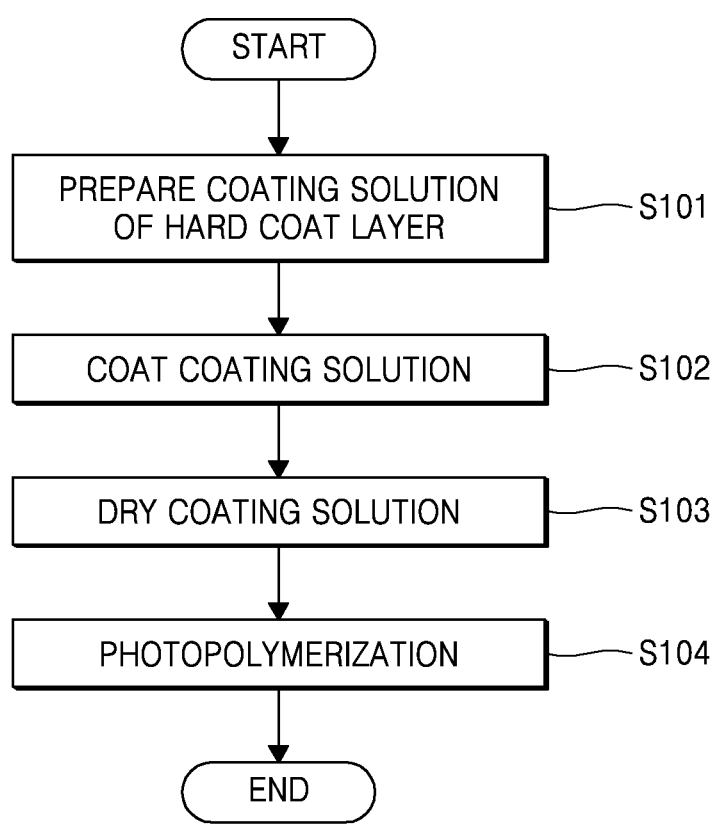
FIG. 6 is a flowchart that illustrates an exemplary embodiment of a method of forming a hard coat layer.

FIG. 6 is a flowchart that illustrates an exemplary embodiment of a method of forming the hard coat layer 12.

First, a coating solution for forming the hard coat layer 12 (a polymer film or a polymer layer) is prepared (S101: a coating solution preparation process). The coating solution may include the metal oxide particles 121, the first component and the second component that constitutes the binder 122, an antistatic agent, a photopolymerization initiator, and a solvent that disperses and/or dissolves these components.

In order to prepare the coating solution, first, the metal oxide particles 121, the first component, the second component, the antistatic agent, and the photopolymerization initiator are added to the solvent. Then, the mixture is stirred to dissolve and/or disperse the metal oxide particles 121, the first component, the second component, the antistatic agent, and the photopolymerization initiator in the solvent. The first component may be mixed with the second component at a ratio sufficient to cause phase separation. For example, when an amount of the first component is less than about 20 parts by weight, or when an amount of the second component is less than about 5 parts by weight, based on 100 parts by weight of the total weight of the hard coat layer 12, phase separation between the first component and the second component may not occur.

The coating solution preparation process may be performed by following (i), (ii), and (iii) steps in this stated order to mix the first component, the second component, the metal oxide particles 121, and a solvent, thereby preparing a coating solution.

(i) The first component is mixed with the first solvent, and the second component is mixed with the second solvent.

(ii) The metal oxide particles 121 are added to and mixed with a mixture of the second component and the second solvent.

(iii) A mixture of the first component and the first solvent is mixed with a mixture of (ii).

Accordingly, these components may be mixed relatively uniformly. The first solvent is a solvent having a relatively low boiling point, e.g., isopropyl alcohol. The second solvent is a solvent having a relatively high boiling point, e.g., diacetone alcohol.

The antistatic agent is mixed with at least one of the first component, the first solvent, and a mixture of the first component and the first solvent. The photopolymerization initiator is mixed with at least one of the second component, the second solvent, and a mixture of the second component and the second solvent.

In the coating solution, a total weight of the first component, the second component, the metal oxide particles 121, the antistatic agent, and the photopolymerization initiator may be in a range of about 1 part by weight or greater and about 80 parts by weight or less, based on 100 parts by weight of the coating solution.

Subsequently, the substrate 11 that is hydrophilic is prepared, and the coating solution prepared in S101 is coated on the substrate 11 (S102: a coating process). The coating may be performed by using, for example, a method using a wire bar.

The coated coating solution is dried (S103: a drying process). The drying process may be performed by allowing the coating solution to stand at room temperature, by heating, or by vacuum-drying. Thereby, a coating layer or coating film is formed. Here, phase separation between the first component and the second component may occur such that a proportion of the first component gradually decreases from the surface portion, i.e., the substrate 11 portion, to the other surface portion. In the drying process, the temperature and drying time may be changed to control the degree of phase separation between the first component and the second component. In particular, as the temperature increases, phase separation may occur easily. In addition, as the drying time increases, phase separation may occur easily. Accordingly, for example, phase separation as shown in FIG. 3A may occur.

Subsequently, by irradiating the coating film with light, such as UV light, photopolymerization of the first component and the second component occurs (S104: a curing process). Accordingly, the first component is photopolymerized with the second component so as to cure a coating film, thereby forming a polymer film. Thus, the hard coat layer 12 may be formed on the substrate 11. Here, since a phase of the first component has been separated from that of the second component, the structure is cured in an intact form, thereby forming a phase separation structure as shown in FIG. 3A.

EXAMPLES

Hereinafter, the present disclosure will be described in detail with reference to the following Examples. However, the scope of the present disclosure is not limited to the Examples.

First, the hard coat layer 12 according to an exemplary embodiment was prepared and evaluated.

Formation of Hard Coat Layer 12

Example 1

In this exemplary embodiment, antimony pentoxide ($Sb_2O_5$) was used as the metal oxide particles 121. As a first component, DMAA was used. As a second component, TMMT was used. As an antistatic agent, PEDOT was used. As a photopolymerization initiator, IRGACURE127 was used. These components were added to diacetone alcohol, i.e., a solvent, in a mixed ratio as shown in FIG. 8. Then, the mixture was stirred. That is, the metal oxide particles 121, i.e., antimony pentoxide ($Sb_2O_5$), were added in an amount of 2.2 parts by weight, based on 100 parts by weight of the total weight of the components excluding the solvent. The first component, i.e., DMAA, was added in an amount of 30 parts by weight. The second component, i.e., TMMT, was added in an amount of 64.5 parts by weight. The antistatic agent, i.e., PEDOT, was added in an amount of 1.3 parts by weight. The photopolymerization initiator, i.e., IRGACURE127, was provided as an isopropyl alcohol solution. Accordingly, the isopropyl alcohol solution was added such that IRGACURE127 in a solid state was 2.0 parts by weight. The solvent, i.e., diacetone alcohol, was added such that an amount of the components excluding the solvent was 30 wt %. Thereby, a coating solution was prepared.

Subsequently, the substrate 11 formed of TAC was prepared, and the coating solution was coated on the substrate 11 by using a wire bar. The coated coating solution was allowed to stand at room temperature for 1 minute, and then was heated and dried at a temperature of 100° C. for 1 minute to thereby form a coating film. The coating film was then subjected to irradiation from a UV lamp (a metal halide lamp, a light quantity of 1,000 milliJoules per square centimeter ($mJ/cm^2$)) for 5 seconds. Thereby, the coating film was cured. By following a sequence of these procedures, the hard coat layer 12 was prepared on the substrate 11. Also, in order to perform evaluation of the hard coat layer 12, a low refractive layer 13 was not prepared.

Examples 2 to 10

As shown in FIG. 8, the type of the first component was changed. Other than these changes, the hard coat layer 12 was prepared in substantially the same manner as in Example 1.

Comparative Example 1

The first component was changed to dimethyl aminoethyl acrylate (DMAEA). Other than these changes, the hard coat layer 12 was prepared in substantially the same manner as in Example 1. DMAEA is a monomer that does not contain an acrylamide skeleton.

Comparative Examples 2 to 4, Examples 11 to 15, Comparative Example 5

The first component was changed to NMMA. As shown in FIG. 9, the amount of the first component was changed. The amount of the second component, i.e., TMMT, was also changed as shown in FIG. 9. Other than these changes, the hard coat layer 12 was prepared in substantially the same manner as in Example 1. In Comparative Example 2, the first component was not added. In Comparative Example 5, the second component was not added.

Examples 16 to 19 and Comparative Examples 6 and 7

The first component was changed to NMMA. As shown in FIG. 10, the amount of the second component was changed. Other than these changes, the hard coat layer 12 was prepared in substantially the same manner as in Example 1. The 35 mol ethoxylated TMMT used in Comparative Example 6 is a hydrophilic monomer, not a hydrophobic monomer. The 20 mol ethoxylated-glycerin triacrylate used in Comparative Example 7 is a hydrophilic monomer, not a hydrophobic monomer.

Examples 20 to 23

The first component was changed to NMMA. The metal oxide particles 121 were changed as shown in FIG. 11. Other than these changes, the hard coat layer 12 was prepared in substantially the same manner as in Example 1.

Evaluation Method

The phase separation, refractive index of a surface layer, a surface resistance value, and thickness of a film of the hard coat layer 12 were evaluated. Hereinafter, an evaluation method will be described.

Phase Separation

A reflectance spectrum was measured to verify whether the hard coat layer 12 is in a phase separation state.

A method of measuring the reflectance spectrum is as follows: a sample is prepared, in which a back side of the substrate 11, i.e., a TAC film, is printed in black. The reason for printing in black is to stop light from being reflected by the back side of the substrate 11, in order to allow accurate evaluation to be performed. As for a measuring device, a spectrophotometer or spectrocolorimeter may be used to measure the reflectance. Here, CM-2600d available from Konica Minolta Co., Ltd. was used as a spectrocolorimeter for measurement.

Figure 7:
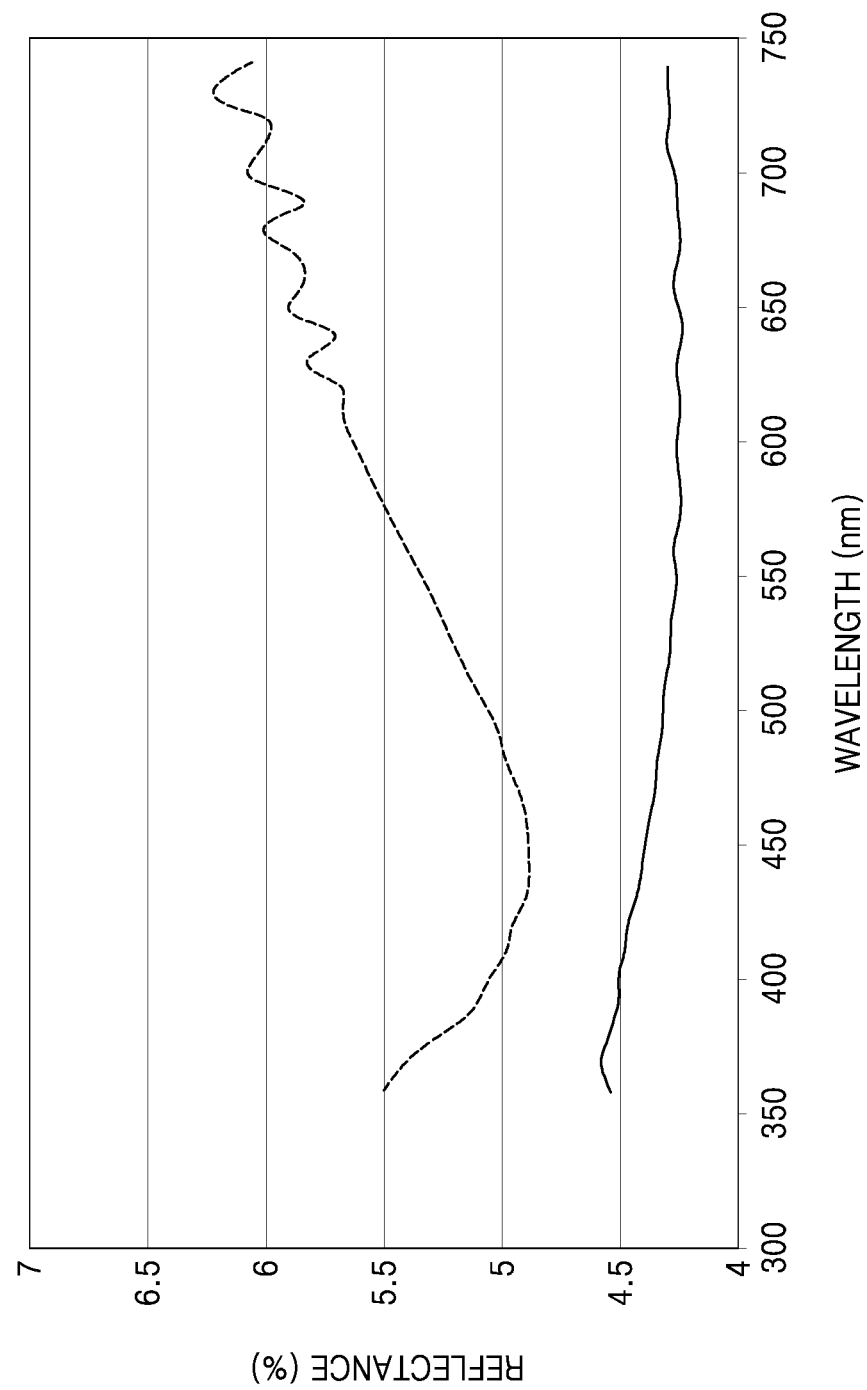
FIG. 7 is a graph showing a reflectance spectrum.

FIG. 7 is a graph showing a reflectance spectrum. In FIG. 7, the x-axis represents wavelength, and the y-axis represents reflectance.

In the case of a general monolayer of the hard coat layer 12 coated on a TAC film, a reflectance spectrum have a linear form, as shown by the bold line in FIG. 7. Since an interface of the TAC film is dissolved in a solvent, interfacial reflection may be ignored. This reason for this is that, since the hard coat layer 12 is a monolayer, interference with light reflected at another interface does not occur. In this regard, the hard coat layer 12 having a reflectance spectrum indicated by a dotted line is found to have light interference. This fact implies existence of another interface. Thus, the reflectance spectrum thereof does not have a linear form, and thus is found to have a lowest (or a greatest) value of the reflectance. This fact implies existence of another interface within the hard coat layer 12 having another layer with a different refractive index. In other words, when the spectrum has a linear form as shown by the bold line in FIG. 7, the hard coat layer 12 is a monolayer and is not in a phase separation state. When the spectrum has the form of a dotted line as in FIG. 7, the hard coat layer 12 includes multiple layers, and is in a phase separation state.

Refractive Index of a Surface Layer

The refractive index of a surface layer and the refractive index of an internal layer may be calculated from the reflectance spectrum of the hard coat layer 12. A simple calculation method is: the lowest value in the reflectance spectrum=a reflectance corresponding to a refractive index of an internal layer, and the greatest value in the reflectance spectrum=a reflectance corresponding to a refractive index of a surface layer.

In general, when a ray from a material having a refractive index $n_1$ is vertically incident on a material having a refractive index $n_2$, a surface reflectance ($R_{ref}$) may be calculated as in the following equation.

$$R_{ref} = \left[\frac{n_1 - n_2}{n_1 + n_2}\right]^2$$

When a refractive index of a surface layer is relatively great, the low refractive index layer 13 may have relatively great effects of suppressing reflection.

Surface Resistance Value

The surface resistance value was measured by using UX MCP-HT800 manufactured by Mitsubishi Chemical Analytech Co., Ltd. This measurement was made under the measuring conditions including a temperature of 24° C. and a relative humidity of 50%.

The lower surface resistance value indicates that the hard coat layer 12 is hard to be charged.

Layer Thickness

A layer thickness was measured by using spectroscopic ellipsometer SMART SE available from Horiba Co., Ltd.

Evaluation Result

The evaluation results are shown in FIGS. 8 to 11. In FIGS. 8 to 11, "o" represents the occurrence of phase separation, and "x" represents non-occurrence of phase separation.

Examples 1 to 10 can be Compared with Comparative Example 1

In each of Examples 1 to 10, phase separation occurred, and the hard coat layer 12 as shown in FIG. 3 was formed. The refractive index of a surface layer and the surface resistance value were also satisfactory. In contrast, in Comparative Example 1, phase separation did not occur, and the hard coat layer 12 as shown in FIG. 3 was not formed. In addition, the refractive index of a surface layer and the surface resistance value of Comparative Example 1 were not good, as compared with Examples 1 to 10. It is deemed that the use of DMAEA, which is a monomer not containing an acrylamide skeleton, was the reason for the non-occurrence of phase separation in Comparative Example 1.

Next, Examples 11 to 15 can be compared with Comparative Examples 2 to 5.

In each of Examples 11 to 15, phase separation occurred, and the hard coat layer 12 as shown in FIG. 3 was formed. The refractive index of a surface layer and the surface resistance value were also satisfactory. In contrast, in each of Comparative Examples 2 to 5, phase separation did not occur, and the hard coat layer 12 as shown in FIG. 3 was not formed. In addition, the refractive index of a surface layer and the surface resistance value of Comparative Examples 2 to 5 were not good, as compared with Examples 11 to 15. It is deemed that the absence of the first component was the reason for the non-occurrence of phase separation in Comparative Example 2. It is deemed that the inappropriate ratio between the first component and the second component was the reason for the non-occurrence of phase separation in Comparative Examples 3 and 4. That is, the first component was not mixed with the second component in a ratio that allows phase separation. It is deemed that the absence of the second component was the reason for the non-occurrence of phase separation in Comparative Example 5.

Examples 16 to 19 can be Compared with Comparative Examples 6 and 7

In each of Examples 16 to 19, phase separation occurred, and the hard coat layer 12 as shown in FIG. 3 was formed. The refractive index of a surface layer and the surface resistance value were also satisfactory. In contrast, in each of Comparative Examples 6 and 7, phase separation did not occur, and the hard coat layer 12 as shown in FIG. 3 was not formed. The surface resistance value was satisfactory; however, the refractive index of a surface layer was poor, as compared with Examples 16 to 19. It is deemed that the use of the second component, which is hydrophilic (not hydrophobic), was the reason for the non-occurrence of phase separation in Comparative Examples 6 and 7. That is, the 35 mol ethoxylated TMMT in Comparative Example 6 has a solubility with respect to water of 50 wt % or greater. In addition, the 20 mol ethoxylated glycerin triacrylate in Comparative Example 7 has a solubility with respect to water of 30 wt % or greater. That is, ethoxylated TMMT and ethoxylated glycerin triacrylate are both hydrophilic.

In each of Examples 20 to 23, phase separation occurred in spite of the change of the metal oxide particles 121, and the hard coat layer 12 as shown in FIG. 3 was formed. The surface resistance value and the refractive index of a surface layer were satisfactory.

As described above, when phase separation does not occur, as was the case in Comparative Examples 1 to 7, the metal oxide particles 121 may not be localized. In addition, the surface resistance value and the refractive index of a surface layer may deteriorate.

As described above in detail, the metal oxide particles 121 may be localized in the hard coat layer 12 (a polymer film or a polymer layer) to a great degree. In addition, the hard coat layer 12 may be formed by performing the coating process once. Therefore, the productivity of forming the hard coat layer 12 is improved, as compared with the productivity of forming a conventional multi-layered hard coat layer formed by applying each layer. In addition, the production cost may decrease, and the yield may improve as well.

Although the display device 1 in the embodiments described herein may include a hard coat layer 12 and a low refractive layer 13 formed on a liquid crystal panel E, exemplary embodiments are not limited thereto. For example, the hard coat layer 12 (and a low refractive layer 13) may be formed on an organic light-emitting diode (OLED) device or a Braun tube display. Also, application of the hard coat layer 12 and the low refractive layer 13 is not limited to a specific display device exemplary embodiment, and instead, may be formed, for example, on a surface of a lens. In this case, the substrate 11 may serve as a main body of a lens that may be formed of glass or plastic. Also, a lens having a hard coat layer 12 and a low refractive layer 13 is an example of an optical member.

Also, although exemplary embodiments herein described a low refractive layer 13 equipped therein, a low refractive layer 13 does not need to be equipped when not necessary. For example, metal oxide particles of the hard coat layer 12 may be replaced with hollow silica particles. In this case, the hollow silica particles may be unevenly distributed with a greater concentration toward the other surface portion (the upper side) in FIG. 3A. In this case, the other surface portion (the upper side) in FIG. 3A of the hard coat layer 12, in which the hollow silica particles are localized, may have a lower refractive index than the other surface portion (the lower side) in FIG. 3A. Accordingly, the hard coat layer 12 may also serve as the low refractive index layer 13.

As apparent from the foregoing description, an optical member, a polarization member, and a display device may be obtained, which employs a polymer film in which metal oxide particles are localized to a great degree.

It should be understood that exemplary embodiments described herein should be considered in a descriptive sense only and not for purposes of limitation. Descriptions of features or aspects within each embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A display device comprising:
   a display that displays an image; and
   a polymer film disposed on the display,
   wherein the polymer film comprises a binder and metal oxide particles,
   the binder comprises a first polymer component and a second polymer component,
   the first polymer component and the second polymer component are miscible with each other,
   the metal oxide particles are unevenly distributed in a thickness direction of the polymer film with a relatively greater concentration of the metal oxide particles being located toward at least one of a surface portion of the polymer film and an other surface portion of the polymer film that is opposite the surface portion in the thickness direction,
   the first polymer component is hydrophilic,
   the second polymer component is hydrophobic relative to the first polymer component,
   a proportion of the first polymer component gradually decreases from the surface portion to the other surface portion, and
   the surface portion is a portion of the polymer film located closest to the display.

2. The display device of claim 1, wherein the binder further comprises a mixed layer between the surface portion and the other surface portion, and in the mixed layer, the first polymer component and the second polymer component are mixed with each other.

3. The display device of claim 1, wherein the metal oxide particles are unevenly distributed with a greater concentration toward the other surface portion.

4. The display device of claim 1, further comprising a low refractive index layer having a refractive index smaller than that of the polymer film, wherein the low refractive index layer is disposed on the other surface portion of the polymer film.

5. The display device of claim 4, wherein the low refractive index layer is hydrophobic relative to the binder and the metal oxide particles.

6. The display device of claim 1, wherein the binder is a product of photopolymerization of:
   a first component that constitutes the first polymer component and is at least one of a monomer and an oligomer, wherein the monomer and the oligomer each comprise an acrylamide skeleton and at least one photopolymerizable functional group in one molecule; and a second component that constitutes the second polymer component and is a monomer comprising at least two photopolymerizable functional groups in one molecule.

7. The display device of claim 6, further comprising an antistatic agent and a polymerization initiator, which are mainly distributed in the polymer film toward the other surface portion.

8. The display device of claim 6, wherein a hydrophilicity of the first component is greater than that of the display, a hydrophilicity of the display is greater than that of the second component, and a hydrophilicity of the second component is greater than that of the metal oxide particles.

9. An optical member comprising:
a substrate; and
a polymer film disposed on the substrate,
wherein the polymer film comprises a binder and metal oxide particles,
the binder comprises a first polymer component and a second polymer component,
the first polymer component and the second polymer component are miscible with each other,
the metal oxide particles are unevenly distributed in a thickness direction of the polymer film with a relatively greater concentration of the metal oxide particles being located toward at least one of a surface portion and an other surface portion of the polymer film that is opposite the surface portion in the thickness direction,
the first polymer component is hydrophilic,
the second polymer component is hydrophobic relative to the first polymer component,
a proportion of the first polymer component gradually decreases from the surface portion to the other surface portion, and
the surface portion is a portion of the polymer film located closest to the substrate.

10. The optical member of claim 9, wherein the binder further comprises a mixed layer between the surface portion and the other surface portion, and in the mixed layer, the first polymer component and the second polymer component are mixed with each other.

11. The optical member of claim 9, wherein the metal oxide particles are unevenly distributed with a greater concentration toward the other surface portion.

12. The optical member of claim 9, further comprising a low refractive index layer having a refractive index smaller than that of the polymer film, wherein the low refractive index layer is disposed on the other surface portion of the polymer film.

13. The optical member of claim 12, wherein the low refractive index layer is hydrophobic relative to the binder and the metal oxide particles.

14. The optical member of claim 9, wherein the binder is a product of photopolymerization of:
a first component that constitutes the first polymer component and is at least one of a monomer and an oligomer, wherein the monomer and the oligomer each comprise an acrylamide skeleton and at least one photopolymerizable functional group in one molecule; and a second component that constitutes the second polymer component and is a monomer comprising at least two photopolymerizable functional groups in one molecule.

15. The optical member of claim 14, further comprising an antistatic agent and a polymerization initiator, which are mainly distributed in the polymer film toward the other surface portion.

16. The optical member of claim 15, wherein, based on 100 parts by weight of a total weight of the polymer film, an amount of the antistatic agent is in a range of about 0.1 parts by weight to about 10 parts by weight and an amount of the polymerization initiator is in a range of about 0.5 parts by weight to about 10 parts by weight.

17. The optical member of claim 14, wherein a hydrophilicity of the first component is greater than that of the substrate, a hydrophilicity of the substrate is greater than that of the second component, and a hydrophilicity of the second component is greater than that of the metal oxide particles.

18. The optical member of claim 14, wherein, based on 100 parts by weight of a total weight of the polymer film, an amount of the first component is in a range of about 20 parts by weight or greater and about 90 parts by weight or less, an amount of the second component is in a range of about 5 parts by weight or greater and about 90 parts by weight or less, and an amount of the metal oxide particles is in a range of about 0.1 parts by weight or greater and about 10 parts by weight or less.

19. A polarization member comprising:
a polarization layer that polarizes light; and
a polymer film disposed on the polarization layer,
wherein the polymer film comprises a binder and metal oxide particles,
the binder comprises a first polymer component and a second polymer component,
the first polymer component and the second polymer component are miscible with each other,
the metal oxide particles are unevenly distributed in a thickness direction of the polymer film with a relatively greater concentration of the metal oxide particles being located toward at least one of a surface portion of the polymer film and an other surface portion of the polymer film that is opposite the surface portion in the thickness direction,
the first polymer component is hydrophilic,
the second polymer component is hydrophobic relative to the first polymer component,
a proportion of the first polymer component gradually decreases from the surface portion to the other surface portion, and
the surface portion is a portion of the polymer film located closest to the polarization layer.

20. The polarization member of claim 19, wherein the binder further comprises a mixed layer between the surface portion and the other surface portion, and in the mixed layer, the first polymer component and the second polymer component are mixed with each other.

* * * * *